United States Patent
Kawahara et al.

(10) Patent No.: US 6,310,588 B1
(45) Date of Patent: Oct. 30, 2001

(54) IMAGE DISPLAY APPARATUS AND IMAGE EVALUATION APPARATUS

(75) Inventors: Isao Kawahara, Toyono-gun; Kunio Sekimoto, Katano, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/121,444

(22) Filed: Jul. 23, 1998

(30) Foreign Application Priority Data

| Jul. 24, 1997 | (JP) | 9-198141 |
| Jul. 28, 1997 | (JP) | 9-201273 |
| Nov. 18, 1997 | (JP) | 9-316768 |
| Dec. 4, 1997 | (JP) | 9-333863 |
| Dec. 11, 1997 | (JP) | 9-341116 |

(51) Int. Cl.[7] .................................................. G09G 3/28
(52) U.S. Cl. .............................................. 345/63; 345/148
(58) Field of Search ................................ 345/60, 63, 147, 345/148, 149, 432, 474, 475; 382/274, 275

(56) References Cited

U.S. PATENT DOCUMENTS

| 5,091,925 | * | 2/1992 | Haendle et al. ................ 378/98.2 |
| 5,760,756 | * | 6/1998 | Kobayashi et al. .............. 345/87 |
| 5,874,932 | * | 2/1999 | Nagaoka et al. ................ 345/60 |
| 5,905,490 | * | 5/1999 | Shu et al. ...................... 345/199 |
| 5,907,316 | * | 5/1999 | Mikoshiba et al. ............. 345/147 |
| 5,969,710 | * | 10/1999 | Doherty et al. ................ 345/148 |
| 6,023,258 | * | 2/2000 | Kuriyama et al. .............. 345/60 |

FOREIGN PATENT DOCUMENTS

| 822536 | 2/1988 | (EP) . |
| 698874 | 2/1996 | (EP) . |
| 2740253 | 4/1997 | (FR) . |
| 7049663 | 2/1995 | (JP) . |
| 8123355 | 5/1996 | (JP) . |
| 983911 | 3/1997 | (JP) . |

OTHER PUBLICATIONS

"A Full–Color Surface Discharge ac Plasma TV Display," by Y. Sano et al., 728 SID 91 Digest, Publication Date May 6, 1991.

"15.3: A Motion–Dependent Equalizing–Pulse Technique for Reducing Gray–Scale Disturbances on PDPs," by Y.W. Zhu et al., SID–97–Digest, Publication Date May 13, 1997.

* cited by examiner

Primary Examiner—Richard Hjerpe
(74) Attorney, Agent, or Firm—Price and Gess

(57) ABSTRACT

An image display apparatus which displays images, suppressing the occurrence of the moving image false edge. The image display apparatus selects a signal level among a plurality of signal levels in accordance with a motion amount of an input image signal, where each signal level is expressed by an arbitrary combination of 0, W1, W2, . . . and WN and luminance weights W1, W2, . . . and WN are assigned to subfields.

22 Claims, 37 Drawing Sheets

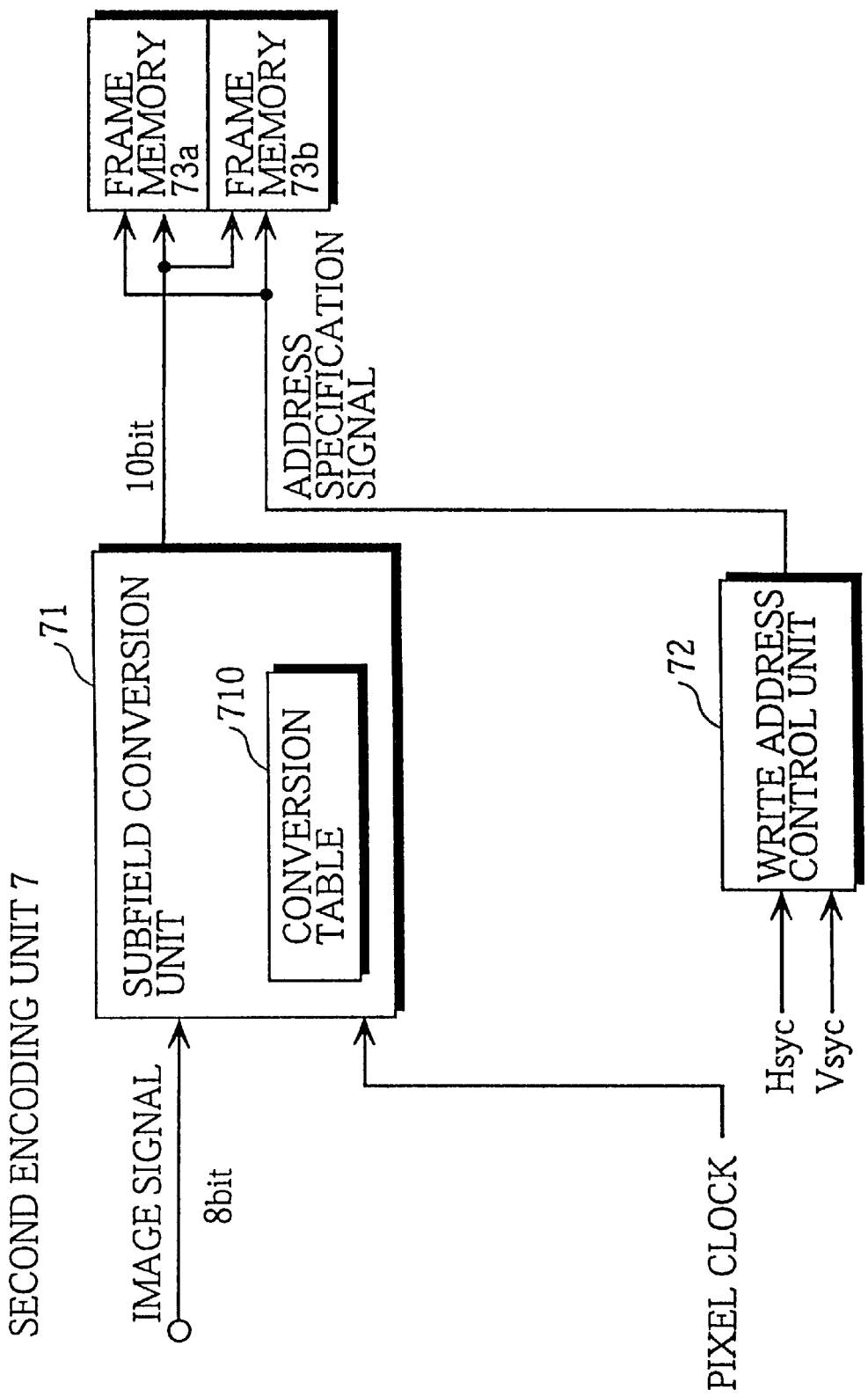

FIG. 3(a)

| (a) INPUT LEVEL | \multicolumn{10}{c}{WEIGHTS FOR SUBFIELDS} | (b') CONVERSION OUTPUT |
|---|---|---|---|---|---|---|---|---|---|---|---|
| | 1 | 2 | 3 | 4 | 5 | 6 | 7 | 8 | 9 | 10 | |
| | 1 | 2 | 4 | 7 | 13 | 23 | 33 | 43 | 56 | 74 | |
| 0 | | | | | | | | | | | 0 |
| 1 | 1 | | | | | | | | | | 1 |
| 2 | | 1 | | | | | | | | | 2 |
| 3 | 1 | 1 | | | | | | | | | 3 |
| 4 | | | 1 | | | | | | | | 4 |
| 5 | 1 | | 1 | | | | | | | | 5 |
| 6 | | 1 | 1 | | | | | | | | 6 |
| 7 | 1 | 1 | 1 | | | | | | | | 7 |
| 8 | | 1 | | 1 | | | | | | | 9 |
| 9 | 1 | 1 | | 1 | | | | | | | 10 |
| 10 | | | 1 | 1 | | | | | | | 11 |
| 11 | | 1 | 1 | 1 | | | | | | | 12 |
| 12 | 1 | | 1 | 1 | | | | | | | 13 |
| 13 | 1 | 1 | 1 | 1 | | | | | | | 14 |
| 14 | 1 | 1 | 1 | 1 | | | | | | | 15 |
| 15 | | 1 | | | 1 | | | | | | 18 |
| 16 | 1 | 1 | | | 1 | | | | | | 19 |
| 17 | | | 1 | | 1 | | | | | | 20 |
| 18 | 1 | | 1 | | 1 | | | | | | 21 |
| 19 | | 1 | 1 | | 1 | | | | | | 22 |
| 20 | 1 | 1 | 1 | | 1 | | | | | | 23 |
| 21 | 1 | | | 1 | 1 | | | | | | 25 |
| 22 | | 1 | | 1 | 1 | | | | | | 26 |
| 23 | 1 | 1 | | 1 | 1 | | | | | | 27 |
| 24 | | | 1 | 1 | 1 | | | | | | 28 |
| 25 | 1 | | 1 | 1 | 1 | | | | | | 29 |
| 26 | | 1 | 1 | 1 | 1 | | | | | | 30 |
| 27 | 1 | 1 | 1 | 1 | 1 | | | | | | 31 |
| 28 | | | | 1 | | 1 | | | | | 37 |
| 29 | 1 | 1 | | | | 1 | | | | | 38 |
| 30 | 1 | 1 | 1 | | | 1 | | | | | 39 |
| 31 | | | | 1 | | 1 | | | | | 41 |
| 32 | 1 | | | 1 | | 1 | | | | | 42 |
| 33 | 1 | 1 | | 1 | | 1 | | | | | 43 |
| 34 | | | 1 | 1 | | 1 | | | | | 44 |
| 35 | 1 | | 1 | 1 | | 1 | | | | | 45 |
| 36 | | 1 | 1 | 1 | | 1 | | | | | 46 |
| 37 | 1 | 1 | 1 | 1 | | 1 | | | | | 47 |
| 38 | | 1 | | | 1 | 1 | | | | | 50 |
| 39 | 1 | 1 | | | 1 | 1 | | | | | 51 |
| 40 | | | 1 | | 1 | 1 | | | | | 52 |
| 41 | 1 | | 1 | | 1 | 1 | | | | | 53 |
| 42 | | 1 | 1 | | 1 | 1 | | | | | 54 |
| 43 | 1 | 1 | 1 | | 1 | 1 | | | | | 55 |
| 44 | 1 | | | 1 | 1 | 1 | | | | | 57 |
| 45 | | 1 | | 1 | 1 | 1 | | | | | 58 |
| 46 | 1 | 1 | | 1 | 1 | 1 | | | | | 59 |
| 47 | | 1 | 1 | 1 | 1 | 1 | | | | | 60 |
| 48 | 1 | | 1 | 1 | 1 | 1 | | | | | 61 |
| 49 | 1 | 1 | 1 | 1 | 1 | 1 | | | | | 62 |
| 50 | 1 | 1 | 1 | 1 | 1 | 1 | | | | | 63 |
| 51 | | | | | | | 1 | | | | 85 |
| 52 | 1 | 1 | | | 1 | | 1 | | | | 86 |
| 53 | 1 | 1 | 1 | | 1 | | 1 | | | | 87 |
| 54 | 1 | | | 1 | | | 1 | | | | 89 |
| 55 | | 1 | | 1 | | | 1 | | | | 90 |
| 56 | 1 | 1 | | 1 | | | 1 | | | | 91 |
| 57 | | | 1 | 1 | | | 1 | | | | 92 |
| 58 | 1 | | 1 | 1 | | | 1 | | | | 93 |
| 59 | | 1 | 1 | 1 | | | 1 | | | | 94 |
| 60 | 1 | 1 | 1 | 1 | | | 1 | | | | 95 |
| 61 | 1 | | | | 1 | | 1 | | | | 101 |
| 62 | | 1 | | | 1 | | 1 | | | | 102 |
| 63 | 1 | 1 | | | 1 | | 1 | | | | 103 |
| 64 | 1 | | 1 | | 1 | | 1 | | | | 105 |
| 65 | | 1 | 1 | | 1 | | 1 | | | | 106 |
| 66 | 1 | 1 | 1 | | 1 | | 1 | | | | 107 |
| 67 | | | | 1 | 1 | | 1 | | | | 108 |
| 68 | 1 | | | 1 | 1 | | 1 | | | | 109 |

FIG. 3(b)

(Table mapping (a) INPUT LEVEL and (b') CONVERSION OUTPUT to USABLE ENCODED OUTPUT (b) / MOTION AMOUNT (m), with columns 9, 8, 7, 6, 5, 4, 3, 2, 1, 0.)

FIG. 4(a)

| (a) | \multicolumn{10}{c}{WEIGHTS FOR SUBFIELDS} | (b') |
|---|---|---|---|---|---|---|---|---|---|---|---|
| INPUT LEVEL | 1 | 2 | 4 | 7 | 13 | 23 | 33 | 43 | 56 | 74 | CONVERSION OUTPUT |
| 69 | | 1 | 1 | 1 | 1 | | | 1 | 1 | | 110 |
| 70 | 1 | | 1 | 1 | 1 | | | 1 | 1 | | 111 |
| 71 | | | 1 | | 1 | | 1 | 1 | 1 | | 114 |
| 72 | 1 | | 1 | | 1 | | 1 | 1 | 1 | | 115 |
| 73 | | 1 | 1 | | 1 | | 1 | 1 | 1 | | 116 |
| 74 | 1 | 1 | 1 | | 1 | | 1 | 1 | 1 | | 117 |
| 75 | | | | 1 | 1 | | 1 | 1 | 1 | | 118 |
| 76 | 1 | | | 1 | 1 | | 1 | 1 | 1 | | 119 |
| 77 | | | 1 | 1 | 1 | | 1 | 1 | 1 | | 121 |
| 78 | 1 | | 1 | 1 | 1 | | 1 | 1 | 1 | | 122 |
| 79 | | 1 | 1 | 1 | 1 | | 1 | 1 | 1 | | 123 |
| 80 | 1 | 1 | 1 | 1 | 1 | | 1 | 1 | 1 | | 124 |
| 81 | | | | | 1 | 1 | 1 | 1 | 1 | | 125 |
| 82 | | 1 | | | 1 | 1 | 1 | 1 | 1 | | 126 |
| 83 | 1 | 1 | 1 | 1 | 1 | 1 | 1 | 1 | 1 | | 127 |
| 84 | 1 | | 1 | | | | | | | 1 | 181 |
| 85 | | 1 | 1 | | | | | | | 1 | 182 |
| 86 | 1 | 1 | 1 | | | | | | | 1 | 183 |
| 87 | 1 | | | 1 | | | | | | 1 | 185 |
| 88 | | 1 | | 1 | | | | | | 1 | 186 |
| 89 | 1 | 1 | | 1 | | | | | | 1 | 187 |
| 90 | | | 1 | 1 | | | | | | 1 | 188 |
| 91 | 1 | | 1 | 1 | | | | | | 1 | 189 |
| 92 | | 1 | 1 | 1 | | | | | | 1 | 190 |
| 93 | 1 | 1 | 1 | 1 | | | | | | 1 | 191 |
| 94 | | | 1 | | 1 | | | | | 1 | 213 |
| 95 | | 1 | 1 | | 1 | | | | | 1 | 214 |
| 96 | 1 | 1 | 1 | | 1 | | | | | 1 | 215 |
| 97 | 1 | | | 1 | 1 | | | | | 1 | 217 |
| 98 | | 1 | | 1 | 1 | | | | | 1 | 218 |
| 99 | 1 | 1 | | 1 | 1 | | | | | 1 | 219 |
| 100 | | | 1 | 1 | 1 | | | | | 1 | 220 |
| 101 | 1 | | 1 | 1 | 1 | | | | | 1 | 221 |
| 102 | | 1 | 1 | 1 | 1 | | | | | 1 | 222 |
| 103 | 1 | 1 | 1 | 1 | 1 | | | | | 1 | 223 |
| 104 | 1 | | 1 | | | 1 | | | | 1 | 229 |
| 105 | | 1 | 1 | | | 1 | | | | 1 | 230 |
| 106 | 1 | 1 | 1 | | | 1 | | | | 1 | 231 |
| 107 | | | | 1 | | 1 | | | | 1 | 233 |
| 108 | | 1 | | 1 | | 1 | | | | 1 | 234 |
| 109 | 1 | 1 | | 1 | | 1 | | | | 1 | 235 |
| 110 | | | 1 | 1 | | 1 | | | | 1 | 236 |
| 111 | 1 | | 1 | 1 | | 1 | | | | 1 | 237 |
| 112 | | 1 | 1 | 1 | | 1 | | | | 1 | 238 |
| 113 | 1 | 1 | 1 | 1 | | 1 | | | | 1 | 239 |
| 114 | | 1 | | | 1 | 1 | | | | 1 | 242 |
| 115 | 1 | 1 | | | 1 | 1 | | | | 1 | 243 |
| 116 | | | 1 | | 1 | 1 | | | | 1 | 244 |
| 117 | 1 | | 1 | | 1 | 1 | | | | 1 | 245 |
| 118 | | 1 | 1 | | 1 | 1 | | | | 1 | 246 |
| 119 | 1 | 1 | 1 | | 1 | 1 | | | | 1 | 247 |
| 120 | 1 | | | 1 | 1 | 1 | | | | 1 | 249 |
| 121 | | 1 | | 1 | 1 | 1 | | | | 1 | 250 |
| 122 | 1 | 1 | | 1 | 1 | 1 | | | | 1 | 251 |
| 123 | | | 1 | 1 | 1 | 1 | | | | 1 | 252 |
| 124 | 1 | | 1 | 1 | 1 | 1 | | | | 1 | 253 |
| 125 | | 1 | 1 | 1 | 1 | 1 | | | | 1 | 254 |
| 126 | 1 | 1 | 1 | 1 | 1 | 1 | | | | 1 | 255 |
| 127 | | | | | | | 1 | | | 1 | 371 |
| 128 | 1 | | | | | | 1 | | | 1 | 372 |
| 129 | | 1 | | | | | 1 | | | 1 | 373 |
| 130 | 1 | 1 | | | | | 1 | | | 1 | 374 |
| 131 | | | 1 | | | | 1 | | | 1 | 375 |
| 132 | 1 | | 1 | | | | 1 | | | 1 | 377 |
| 133 | | 1 | 1 | | | | 1 | | | 1 | 378 |
| 134 | 1 | 1 | 1 | | | | 1 | | | 1 | 379 |
| 135 | | | | 1 | | | 1 | | | 1 | 380 |
| 136 | 1 | | | 1 | | | 1 | | | 1 | 381 |
| 137 | | 1 | | 1 | | | 1 | | | 1 | 382 |
| 138 | 1 | 1 | | 1 | | | 1 | | | 1 | 383 |

FIG. 4(b)

| (a) | (b') | \multicolumn{10}{c}{USABLE ENCODED OUTPUT (b) MOTION AMOUNT (m)} |
|---|---|---|---|---|---|---|---|---|---|---|---|
| INPUT LEVEL | CONVERSION OUTPUT | 9 | 8 | 7 | 6 | 5 | 4 | 3 | 2 | 1 | 0 |
| 69 | 110 | | | | | | ● | ● | ● | ● | ● |
| 70 | 111 | | | | | | ● | ● | ● | ● | ● |
| 71 | 114 | | | | | ● | ● | ● | ● | ● | ● |
| 72 | 115 | | | | | ● | ● | ● | ● | ● | ● |
| 73 | 116 | | | | | ● | ● | ● | ● | ● | ● |
| 74 | 117 | | | | | ● | ● | ● | ● | ● | ● |
| 75 | 118 | | | | | ● | ● | ● | ● | ● | ● |
| 76 | 119 | | | | | ● | ● | ● | ● | ● | ● |
| 77 | 121 | | | | ● | ● | ● | ● | ● | ● | ● |
| 78 | 122 | | | | ● | ● | ● | ● | ● | ● | ● |
| 79 | 123 | | | | ● | ● | ● | ● | ● | ● | ● |
| 80 | 124 | | | ● | ● | ● | ● | ● | ● | ● | ● |
| 81 | 125 | | | ● | ● | ● | ● | ● | ● | ● | ● |
| 82 | 126 | | ● | ● | ● | ● | ● | ● | ● | ● | ● |
| 83 | 127 | ● | ● | ● | ● | ● | ● | ● | ● | ● | ● |
| 84 | 181 | | | | | | | | | ● | ● |
| 85 | 182 | | | | | | | | | ● | ● |
| 86 | 183 | | | | | | | | | ● | ● |
| 87 | 185 | | | | | | | | | ● | ● |
| 88 | 186 | | | | | | | | | ● | ● |
| 89 | 187 | | | | | | | | | ● | ● |
| 90 | 188 | | | | | | | | | ● | ● |
| 91 | 189 | | | | | | | | | ● | ● |
| 92 | 190 | | | | | | | | | ● | ● |
| 93 | 191 | | | | | | | | | ● | ● |
| 94 | 213 | | | | | | ● | ● | ● | ● | ● |
| 95 | 214 | | | | | | ● | ● | ● | ● | ● |
| 96 | 215 | | | | | | ● | ● | ● | ● | ● |
| 97 | 217 | | | | | | ● | ● | ● | ● | ● |
| 98 | 218 | | | | | | ● | ● | ● | ● | ● |
| 99 | 219 | | | | | | ● | ● | ● | ● | ● |
| 100 | 220 | | | | | | ● | ● | ● | ● | ● |
| 101 | 221 | | | | | | ● | ● | ● | ● | ● |
| 102 | 222 | | | | | | ● | ● | ● | ● | ● |
| 103 | 223 | | | | | | ● | ● | ● | ● | ● |
| 104 | 229 | | | | | ● | ● | ● | ● | ● | ● |
| 105 | 230 | | | | | ● | ● | ● | ● | ● | ● |
| 106 | 231 | | | | | ● | ● | ● | ● | ● | ● |
| 107 | 233 | | | | | ● | ● | ● | ● | ● | ● |
| 108 | 234 | | | | | ● | ● | ● | ● | ● | ● |
| 109 | 235 | | | | | ● | ● | ● | ● | ● | ● |
| 110 | 236 | | | | | ● | ● | ● | ● | ● | ● |
| 111 | 237 | | | | | ● | ● | ● | ● | ● | ● |
| 112 | 238 | | | | | ● | ● | ● | ● | ● | ● |
| 113 | 239 | | | | | ● | ● | ● | ● | ● | ● |
| 114 | 242 | | | | ● | ● | ● | ● | ● | ● | ● |
| 115 | 243 | | | | ● | ● | ● | ● | ● | ● | ● |
| 116 | 244 | | | | ● | ● | ● | ● | ● | ● | ● |
| 117 | 245 | | | | ● | ● | ● | ● | ● | ● | ● |
| 118 | 246 | | | | ● | ● | ● | ● | ● | ● | ● |
| 119 | 247 | | | | ● | ● | ● | ● | ● | ● | ● |
| 120 | 249 | | | ● | ● | ● | ● | ● | ● | ● | ● |
| 121 | 250 | | | ● | ● | ● | ● | ● | ● | ● | ● |
| 122 | 251 | | | ● | ● | ● | ● | ● | ● | ● | ● |
| 123 | 252 | | ● | ● | ● | ● | ● | ● | ● | ● | ● |
| 124 | 253 | | ● | ● | ● | ● | ● | ● | ● | ● | ● |
| 125 | 254 | | ● | ● | ● | ● | ● | ● | ● | ● | ● |
| 126 | 255 | ● | ● | ● | ● | ● | ● | ● | ● | ● | ● |
| 127 | 371 | | | | | | | | | ● | ● |
| 128 | 372 | | | | | | | | | ● | ● |
| 129 | 373 | | | | | | | | | ● | ● |
| 130 | 374 | | | | | | | | | ● | ● |
| 131 | 375 | | | | | | | | | ● | ● |
| 132 | 377 | | | | | | | | | ● | ● |
| 133 | 378 | | | | | | | | | ● | ● |
| 134 | 379 | | | | | | | | | ● | ● |
| 135 | 380 | | | | | | | | | ● | ● |
| 136 | 381 | | | | | | | | | ● | ● |
| 137 | 382 | | | | | | | | | ● | ● |
| 138 | 383 | | | | | | | | | ● | ● |

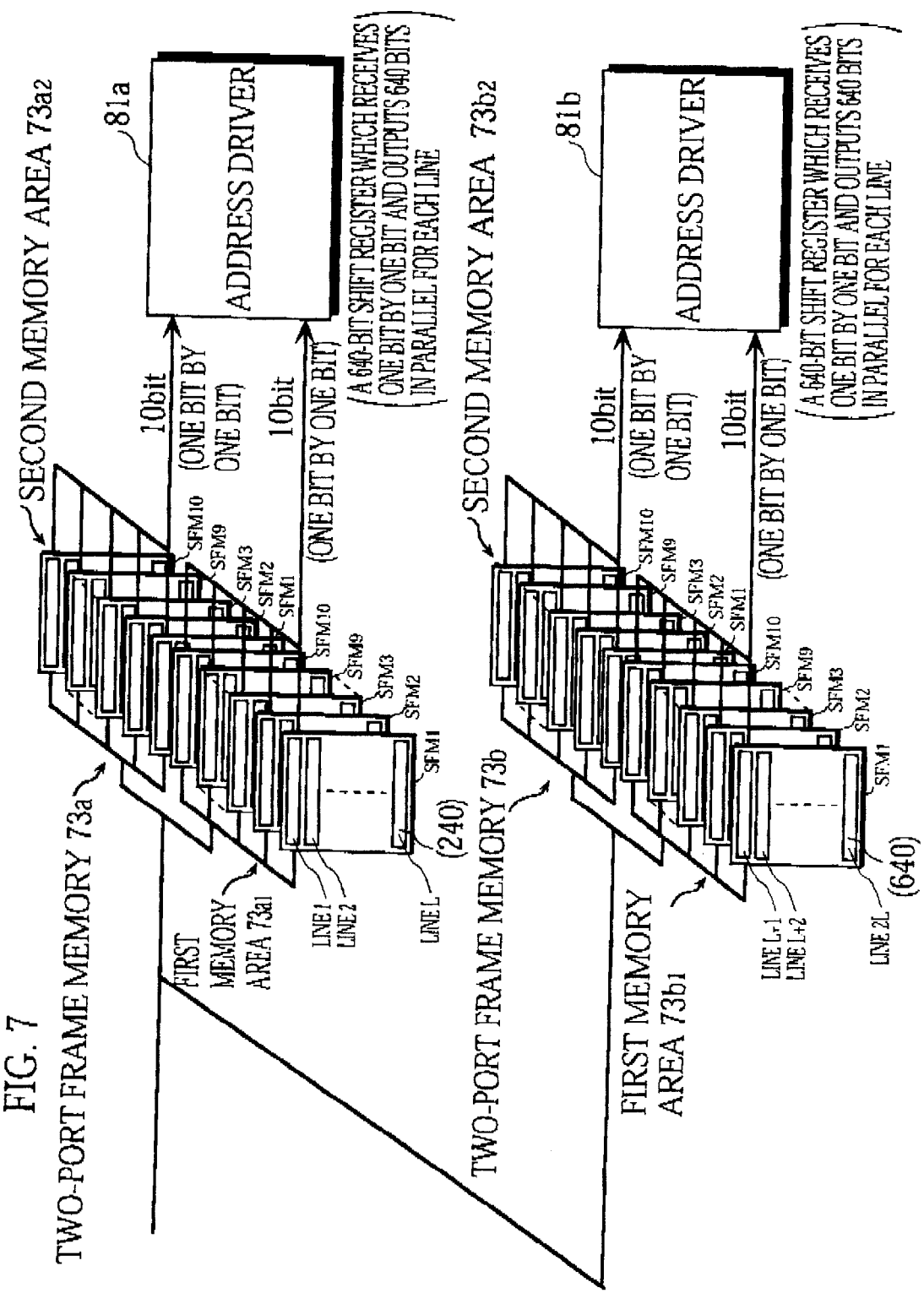

FIG. 12

| OUTPUT OF MOTION AMOUNT DETECTING UNIT | OUTPUT OF SLANT BLOCK DETECTING UNIT | OUTPUT OF MOTION AMOUNT CORRECTING UNIT |
|---|---|---|
| 0000 | 1111 | 0000 |
|  | 0000 | 0000 |
| 0001 | 1111 | 0001 |
|  | 0000 | 0000 |
| 0010 | 1111 | 0010 |
|  | 0000 | 0000 |
| 0011 | 1111 | 0011 |
|  | 0000 | 0000 |
| 0100 | 1111 | 0100 |
|  | 0000 | 0000 |
| 0101 | 1111 | 0101 |
|  | 0000 | 0000 |
| 0110 | 1111 | 0110 |
|  | 0000 | 0000 |
| 0111 | 1111 | 0111 |
|  | 0000 | 0000 |
| 1000 | 1111 | 1000 |
|  | 0000 | 0000 |
| 1001 | 1111 | 1001 |
|  | 0000 | 0000 |

FIG. 15

| INPUT SIGNAL LEVEL \ DISPLAY PERIOD | S1 (16) | S2 (16) | S3 (16) | S4 (16) | S5 (16) | S6 (16) | S7 (16) | S8 (16) | S9 (16) | S10 (16) | S11 (16) | S12 (16) | S13 (16) | S14 (16) | S15 (16) | S16 (8) | S17 (4) | S18 (2) | S19 (1) |
|---|---|---|---|---|---|---|---|---|---|---|---|---|---|---|---|---|---|---|---|
| 0 | | | | | | | | | | | | | | | | | | | |
| 1 | | | | | | | | | | | | | | | | | | | ● |
| 2 | | | | | | | | | | | | | | | | | | ● | |
| 3 | | | | | | | | | | | | | | | | | | ● | ● |
| 4 | | | | | | | | | | | | | | | | | ● | | |
| 5 | | | | | | | | | | | | | | | | | ● | | ● |
| 6 | | | | | | | | | | | | | | | | | ● | ● | ● |
| 7 | | | | | | | | | | | | | | | | | ● | ● | ● |
| 8 | | | | | | | | | | | | | | | | ● | | | |
| 9 | | | | | | | | | | | | | | | | ● | | | ● |
| 10 | | | | | | | | | | | | | | | | ● | | ● | |
| 11 | | | | | | | | | | | | | | | | ● | | ● | ● |
| 12 | | | | | | | | | | | | | | | | ● | ● | | |
| 13 | | | | | | | | | | | | | | | | ● | ● | | ● |
| 14 | | | | | | | | | | | | | | | | ● | ● | ● | |
| 15 | | | | | | | | | | | | | | | | ● | ● | ● | ● |
| 16-31 | | | | | | | | | | | | | | | ● | | | | |
| 32-47 | | | | | | | | | | | | | | ● | ● | | | | |
| 48-63 | | | | | | | | | | | | | ● | ● | ● | | | | |
| 64-79 | | | | | | | | | | | | ● | ● | ● | ● | | | | |
| 80-95 | | | | | | | | | | | ● | ● | ● | ● | ● | | | | |
| 96-111 | | | | | | | | | | ● | ● | ● | ● | ● | ● | | | | |
| 112-127 | | | | | | | | | ● | ● | ● | ● | ● | ● | ● | | | | |
| 128-143 | | | | | | | | ● | ● | ● | ● | ● | ● | ● | ● | | | | |
| 144-159 | | | | | | | ● | ● | ● | ● | ● | ● | ● | ● | ● | | | | |
| 160-175 | | | | | | ● | ● | ● | ● | ● | ● | ● | ● | ● | ● | | | | |
| 176-191 | | | | | ● | ● | ● | ● | ● | ● | ● | ● | ● | ● | ● | | | | |
| 192-207 | | | | ● | ● | ● | ● | ● | ● | ● | ● | ● | ● | ● | ● | | | | |
| 208-223 | | | ● | ● | ● | ● | ● | ● | ● | ● | ● | ● | ● | ● | ● | | | | |
| 224-239 | | ● | ● | ● | ● | ● | ● | ● | ● | ● | ● | ● | ● | ● | ● | | | | |
| 240-255 | ● | ● | ● | ● | ● | ● | ● | ● | ● | ● | ● | ● | ● | ● | ● | | | | |

{ ●: ILLUMINATION
{ BLANK: NON-ILLUMINATION

FIG. 25

| PIXEL POSITION | SUBFIELDS | | | | | | | | MOTION VECTOR $\overrightarrow{MV}$ |
|---|---|---|---|---|---|---|---|---|---|
| | SF1 | SF2 | SF3 | SF4 | SF5 | SF6 | SF7 | SF8 | |
| P(1,1) | ● | ● | ● | | | | | | $\overrightarrow{MV}_{(1,1)}$ |
| P(1,2) | ● | ● | ● | ● | | | | | $\overrightarrow{MV}_{(1,2)}$ |
| ... | ... | ... | ... | ... | ... | ... | ... | ... | ... |
| P(1,m) | ● | ● | ● | | | | | | $\overrightarrow{MV}_{(1,m)}$ |
| P(2,1) | ● | ● | ● | ● | | | | | $\overrightarrow{MV}_{(2,1)}$ |
| P(2,2) | ● | | | | | | | | $\overrightarrow{MV}_{(2,2)}$ |
| ... | ... | ... | ... | ... | ... | ... | ... | ... | ... |
| P(2,m) | ● | | ● | | | | | | $\overrightarrow{MV}_{(2,m)}$ |
| ... | ... | ... | ... | ... | ... | ... | ... | ... | ... |
| P(n,1) | ● | ● | ● | ● | ● | | | | $\overrightarrow{MV}_{(n,1)}$ |
| ... | ... | ... | ... | ... | ... | ... | ... | ... | ... |
| P(n,m) | ● | | ● | ● | ● | | | | $\overrightarrow{MV}_{(n,m)}$ |

(●INDICATES ILUMINATION)

FIG. 26

| | PULSE ILLUMINATION TIME |
|---|---|
| SUBFIELD SF1 | $t_1$ |
| SUBFIELD SF2 | $t_2, t_3$ |
| SUBFIELD SF3 | $t_4, t_5, t_6, t_7$ |
| ⋮ | |
| SUBFIELD SF8 | $t_{128}, \cdots t_{255}$ |

FIG. 27

| WEIGHT FOR SUBFIELD / INPUT LEVEL | 1 | 2 | 4 | 8 | 16 | 32 | 64 | 128 | ENCODED LEVEL |
|---|---|---|---|---|---|---|---|---|---|
| 0 | | | | | | | | | 0 |
| 1 | ● | | | | | | | | 1 |
| 2-5 | ● | ● | | | | | | | 3 |
| 6-11 | ● | ● | ● | | | | | | 7 |
| 12-23 | ● | ● | ● | ● | | | | | 15 |
| 24-47 | ● | ● | ● | ● | ● | | | | 31 |
| 48-95 | ● | ● | ● | ● | ● | ● | | | 63 |
| 96-191 | ● | ● | ● | ● | ● | ● | ● | | 127 |
| 192-255 | ● | ● | ● | ● | ● | ● | ● | ● | 255 |

FIG. 28

| | WEIGHT FOR SUBFIELD | | | | | | | | ENCODED LEVEL |
|---|---|---|---|---|---|---|---|---|---|
| INPUT LEVEL | 1 | 2 | 4 | 8 | 16 | 32 | 64 | 128 | |
| 1 | 0 | | | | | | | | | 0 |
| 2 | 1 | ● | | | | | | | | 1 |
| 3 | 2 | | ● | | | | | | | 2 |
| 4 | 3 | ● | ● | | | | | | | 3 |
| 5 | 4 | | | ● | | | | | | 4 |
| 6 | 5 | ● | | ● | | | | | | 5 |
| 7 | 6 | | ● | ● | | | | | | 6 |
| 8 | 7-11 | ● | ● | ● | | | | | | 7 |
| 9 | 12-23 | ● | ● | ● | ● | | | | | 15 |
| 10 | 24-47 | ● | ● | ● | ● | ● | | | | 31 |
| 11 | 48-95 | ● | ● | ● | ● | ● | ● | | | 63 |
| 12 | 96-191 | ● | ● | ● | ● | ● | ● | ● | | 127 |
| 13 | 192-255 | ● | ● | ● | ● | ● | ● | ● | ● | 255 |

FIG. 29

| | WEIGHT FOR SUBFIELD | 1 | 2 | 4 | 8 | 16 | 32 | 64 | 128 | ENCODED LEVEL |
|---|---|---|---|---|---|---|---|---|---|---|
| | INPUT LEVEL | | | | | | | | | |
| 1 | 0 | | | | | | | | | 0 |
| 2 | 1 | ● | | | | | | | | 1 |
| 3 | 2 | | ● | | | | | | | 2 |
| 4 | 3 | ● | ● | | | | | | | 3 |
| 5 | 4 | | | ● | | | | | | 4 |
| 6 | 5 | ● | | ● | | | | | | 5 |
| 7 | 6 | | ● | ● | | | | | | 6 |
| 8 | 7-10 | ● | ● | ● | | | | | | 7 |
| 9 | 11-23 | ● | ● | ● | ● | | | | | 15 |
| 10 | 24-47 | ● | ● | ● | ● | ● | | | | 31 |
| 11 | 48-59 | ● | ● | ● | | ● | ● | | | 55 |
| 12 | 60-87 | ● | ● | ● | ● | ● | ● | | | 63 |
| 13 | 88-119 | ● | ● | ● | ● | | ● | ● | | 111 |
| 14 | 120-175 | ● | ● | ● | ● | ● | ● | ● | | 127 |
| 15 | 176-239 | ● | ● | ● | ● | ● | | ● | ● | 223 |
| 16 | 240-255 | ● | ● | ● | ● | ● | ● | ● | ● | 255 |

FIG. 30

| (a) INPUT LEVEL | WEIGHTS FOR SUBFIELDS | | | | | | | | | | (b') CONVERSION OUTPUT |
|---|---|---|---|---|---|---|---|---|---|---|---|
| | 10 | 9 | 8 | 7 | 6 | 5 | 4 | 3 | 2 | 1 | |
| | 74 | 56 | 43 | 33 | 23 | 13 | 7 | 4 | 2 | 1 | |
| 0 | | | | | | | | | | | 0 |
| 1 | | | | | | | | | | 1 | 1 |
| 2 | | | | | | | | | 1 | | 2 |
| 3 | | | | | | | | | 1 | 1 | 3 |
| 4 | | | | | | | | 1 | | | 4 |
| 5 | | | | | | | | 1 | | 1 | 5 |
| 6 | | | | | | | | 1 | 1 | | 6 |
| 7 | | | | | | | | 1 | 1 | 1 | 7 |
| 8 | | | | | | | 1 | | | | 9 |
| 9 | | | | | | | 1 | | | 1 | 10 |
| 10 | | | | | | | 1 | | 1 | | 11 |
| 11 | | | | | | | 1 | | 1 | 1 | 12 |
| 12 | | | | | | | 1 | 1 | | | 13 |
| 13 | | | | | | | 1 | 1 | | 1 | 14 |
| 14 | | | | | | | 1 | 1 | 1 | | 15 |
| 15 | | | | | | 1 | | | | | 18 |
| 16 | | | | | | 1 | | | | 1 | 19 |
| 17 | | | | | | 1 | | | 1 | | 20 |
| 18 | | | | | | 1 | | | 1 | 1 | 21 |
| 19 | | | | | | 1 | | 1 | | | 22 |
| 20 | | | | | | 1 | | 1 | | 1 | 23 |
| 21 | | | | | | 1 | | 1 | 1 | | 25 |
| 22 | | | | | | 1 | 1 | | | | 26 |
| 23 | | | | | | 1 | 1 | | | 1 | 27 |
| 24 | | | | | | 1 | 1 | | 1 | | 28 |
| 25 | | | | | | 1 | 1 | | 1 | 1 | 29 |
| 26 | | | | | | 1 | 1 | 1 | | | 30 |
| 27 | | | | | | 1 | 1 | 1 | | 1 | 31 |
| 28 | | | | | 1 | | | | | | 37 |
| 29 | | | | | 1 | | | | | 1 | 38 |
| 30 | | | | | 1 | | | | 1 | | 39 |
| 31 | | | | | 1 | | | 1 | | | 41 |
| 32 | | | | | 1 | | | 1 | | 1 | 42 |
| 33 | | | | | 1 | | | 1 | 1 | | 43 |
| 34 | | | | | 1 | | 1 | | | | 44 |
| 35 | | | | | 1 | | 1 | | | 1 | 45 |
| 36 | | | | | 1 | | 1 | | 1 | | 46 |
| 37 | | | | | 1 | | 1 | 1 | | | 47 |
| 38 | | | | | 1 | 1 | | | | | 50 |
| 39 | | | | | 1 | 1 | | | | 1 | 51 |
| 40 | | | | | 1 | 1 | | | 1 | | 52 |
| 41 | | | | | 1 | 1 | | 1 | | | 53 |
| 42 | | | | | 1 | 1 | | 1 | | 1 | 54 |
| 43 | | | | | 1 | 1 | | 1 | 1 | | 55 |
| 44 | | | | | 1 | 1 | 1 | | | | 57 |
| 45 | | | | | 1 | 1 | 1 | | | 1 | 58 |
| 46 | | | | | 1 | 1 | 1 | | 1 | | 59 |
| 47 | | | | | 1 | 1 | 1 | 1 | | | 60 |
| 48 | | | | | 1 | 1 | 1 | 1 | | 1 | 61 |
| 49 | | | | | 1 | 1 | 1 | 1 | 1 | | 62 |
| 50 | | | | 1 | | | | | | | 63 |
| 51 | | | | 1 | | | | | | 1 | 85 |
| 52 | | | | 1 | | | | | 1 | | 86 |
| 53 | | | | 1 | | | | 1 | | | 87 |
| 54 | | | | 1 | | | | 1 | | 1 | 89 |
| 55 | | | | 1 | | | 1 | | | | 90 |
| 56 | | | | 1 | | | 1 | | | 1 | 91 |
| 57 | | | | 1 | | | 1 | | 1 | | 92 |
| 58 | | | | 1 | | | 1 | 1 | | | 93 |
| 59 | | | | 1 | | 1 | | | | | 94 |
| 60 | | | | 1 | | 1 | | | | 1 | 95 |
| 61 | | | | 1 | | 1 | | | 1 | | 101 |
| 62 | | | | 1 | | 1 | | 1 | | | 102 |
| 63 | | | | 1 | | 1 | | 1 | | 1 | 103 |
| 64 | | | | 1 | | 1 | 1 | | | | 105 |
| 65 | | | | 1 | | 1 | 1 | | | 1 | 106 |
| 66 | | | | 1 | | 1 | 1 | | 1 | | 107 |
| 67 | | | | 1 | | 1 | 1 | 1 | | | 108 |
| 68 | | | | 1 | | 1 | 1 | 1 | | 1 | 109 |

FIG. 31

| (a) INPUT LEVEL | WEIGHTS FOR SUBFIELDS 10 9 8 7 6 5 4 3 2 1 / 74 56 43 33 23 13 7 4 2 1 | (b') CONVERSION OUTPUT |
|---|---|---|
| 69 | | 110 |
| 70 | | 111 |
| 71 | | 114 |
| 72 | | 115 |
| 73 | | 116 |
| 74 | | 117 |
| 75 | | 118 |
| 76 | | 119 |
| 77 | | 121 |
| 78 | | 122 |
| 79 | | 123 |
| 80 | | 124 |
| 81 | | 125 |
| 82 | | 126 |
| 83 | | 127 |
| 84 | | 181 |
| 85 | | 182 |
| 86 | | 183 |
| 87 | | 185 |
| 88 | | 186 |
| 89 | | 187 |
| 90 | | 188 |
| 91 | | 189 |
| 92 | | 190 |
| 93 | | 191 |
| 94 | | 213 |
| 95 | | 214 |
| 96 | | 215 |
| 97 | | 217 |
| 98 | | 218 |
| 99 | | 219 |
| 100 | | 220 |
| 101 | | 221 |
| 102 | | 222 |
| 103 | | 223 |
| 104 | | 229 |
| 105 | | 230 |
| 106 | | 231 |
| 107 | | 233 |
| 108 | | 234 |
| 109 | | 235 |
| 110 | | 236 |
| 111 | | 237 |
| 112 | | 238 |
| 113 | | 239 |
| 114 | | 242 |
| 115 | | 243 |
| 116 | | 244 |
| 117 | | 245 |
| 118 | | 246 |
| 119 | | 247 |
| 120 | | 249 |
| 121 | | 250 |
| 122 | | 251 |
| 123 | | 252 |
| 124 | | 253 |
| 125 | | 254 |
| 126 | | 255 |
| 127 | | 371 |
| 128 | | 372 |
| 129 | | 373 |
| 130 | | 374 |
| 131 | | 375 |
| 132 | | 377 |
| 133 | | 378 |
| 134 | | 379 |
| 135 | | 380 |
| 136 | | 381 |
| 137 | | 382 |
| 138 | | 383 |

FIG. 32

| (a) INPUT LEVEL | \multicolumn{10}{c}{WEIGHTS FOR SUBFIELDS} | (b) CONVERSION OUTPUT |
|---|---|---|---|---|---|---|---|---|---|---|---|
| | 10 / 74 | 9 / 56 | 8 / 43 | 7 / 33 | 6 / 23 | 5 / 13 | 4 / 7 | 3 / 4 | 2 / 2 | 1 / 1 | |
| 139 | | | | | 1 | | | 1 | | 1 | 437 |
| 140 | | 1 | 1 | | | 1 | | | 1 | | 438 |
| 141 | | 1 | 1 | | | 1 | | | 1 | 1 | 439 |
| 142 | | 1 | 1 | | 1 | | 1 | | | 1 | 441 |
| 143 | | 1 | 1 | | 1 | | 1 | | 1 | | 442 |
| 144 | | 1 | 1 | | 1 | | 1 | | 1 | 1 | 443 |
| 145 | | 1 | 1 | | 1 | 1 | | 1 | | | 444 |
| 146 | | 1 | 1 | | 1 | 1 | | 1 | | 1 | 445 |
| 147 | | 1 | 1 | | 1 | 1 | | 1 | 1 | | 446 |
| 148 | | 1 | 1 | | 1 | 1 | | 1 | 1 | 1 | 447 |
| 149 | | 1 | 1 | 1 | | | 1 | 1 | | | 469 |
| 150 | | 1 | 1 | 1 | | | 1 | 1 | | 1 | 470 |
| 151 | | 1 | 1 | 1 | | | 1 | 1 | 1 | | 471 |
| 152 | | 1 | 1 | 1 | | 1 | | | | 1 | 473 |
| 153 | | 1 | 1 | 1 | | 1 | | | 1 | | 474 |
| 154 | | 1 | 1 | 1 | | 1 | | | 1 | 1 | 475 |
| 155 | | 1 | 1 | 1 | | 1 | | 1 | | | 476 |
| 156 | | 1 | 1 | 1 | | 1 | | 1 | | 1 | 477 |
| 157 | | 1 | 1 | 1 | | 1 | | 1 | 1 | | 478 |
| 158 | | 1 | 1 | 1 | | 1 | | 1 | 1 | 1 | 479 |
| 159 | | 1 | 1 | 1 | 1 | | | | 1 | | 485 |
| 160 | | 1 | 1 | 1 | 1 | | | | 1 | 1 | 486 |
| 161 | | 1 | 1 | 1 | 1 | | | 1 | 1 | | 487 |
| 162 | | 1 | 1 | 1 | 1 | | 1 | | | 1 | 489 |
| 163 | | 1 | 1 | 1 | 1 | | 1 | | 1 | | 490 |
| 164 | | 1 | 1 | 1 | 1 | | 1 | | 1 | 1 | 491 |
| 165 | | 1 | 1 | 1 | 1 | | 1 | 1 | | | 492 |
| 166 | | 1 | 1 | 1 | 1 | | 1 | 1 | | 1 | 493 |
| 167 | | 1 | 1 | 1 | 1 | | 1 | 1 | 1 | | 494 |
| 168 | | 1 | 1 | 1 | 1 | | 1 | 1 | 1 | 1 | 495 |
| 169 | | 1 | 1 | 1 | 1 | 1 | | | 1 | | 498 |
| 170 | | 1 | 1 | 1 | 1 | 1 | | | 1 | 1 | 499 |
| 171 | | 1 | 1 | 1 | 1 | 1 | | 1 | | | 500 |
| 172 | | 1 | 1 | 1 | 1 | 1 | | 1 | | 1 | 501 |
| 173 | | 1 | 1 | 1 | 1 | 1 | | 1 | 1 | | 502 |
| 174 | | 1 | 1 | 1 | 1 | 1 | | 1 | 1 | 1 | 503 |
| 175 | | 1 | 1 | 1 | 1 | 1 | 1 | | | 1 | 505 |
| 176 | | 1 | 1 | 1 | 1 | 1 | 1 | | 1 | | 506 |
| 177 | | 1 | 1 | 1 | 1 | 1 | 1 | | 1 | 1 | 507 |
| 178 | | 1 | 1 | 1 | 1 | 1 | 1 | 1 | | | 508 |
| 179 | | 1 | 1 | 1 | 1 | 1 | 1 | 1 | | 1 | 509 |
| 180 | | 1 | 1 | 1 | 1 | 1 | 1 | 1 | 1 | | 510 |
| 181 | | 1 | 1 | 1 | 1 | 1 | 1 | 1 | 1 | 1 | 511 |
| 182 | 1 | | | 1 | 1 | 1 | 1 | | | | 746 |
| 183 | 1 | | | 1 | 1 | 1 | 1 | | | 1 | 747 |
| 184 | 1 | | | 1 | 1 | 1 | 1 | | 1 | | 748 |
| 185 | 1 | | | 1 | 1 | 1 | 1 | | 1 | 1 | 749 |
| 186 | 1 | | | 1 | 1 | 1 | 1 | 1 | | | 750 |
| 187 | 1 | | | 1 | 1 | 1 | 1 | 1 | | 1 | 751 |
| 188 | 1 | | | 1 | 1 | 1 | 1 | 1 | 1 | | 754 |
| 189 | 1 | | 1 | | | | 1 | 1 | 1 | | 755 |
| 190 | 1 | | 1 | | | | 1 | 1 | 1 | 1 | 756 |
| 191 | 1 | | 1 | | | 1 | | | | 1 | 757 |
| 192 | 1 | | 1 | | | 1 | | | 1 | | 758 |
| 193 | 1 | | 1 | | | 1 | | | 1 | 1 | 759 |
| 194 | 1 | | 1 | | | 1 | | 1 | | 1 | 761 |
| 195 | 1 | | 1 | | | 1 | | 1 | 1 | | 762 |
| 196 | 1 | | 1 | | | 1 | | 1 | 1 | 1 | 763 |
| 197 | 1 | | 1 | | | 1 | 1 | | | | 764 |
| 198 | 1 | | 1 | | | 1 | 1 | | | 1 | 765 |
| 199 | 1 | | 1 | | | 1 | 1 | | 1 | | 766 |
| 200 | 1 | | 1 | | | 1 | 1 | | 1 | 1 | 767 |
| 201 | 1 | 1 | | 1 | | | | 1 | 1 | | 883 |
| 202 | 1 | 1 | | 1 | | | | 1 | 1 | 1 | 884 |
| 203 | 1 | 1 | | 1 | | | 1 | | | 1 | 885 |
| 204 | 1 | 1 | | 1 | | | 1 | | 1 | | 886 |
| 205 | 1 | 1 | | 1 | | | 1 | | 1 | 1 | 887 |
| 206 | 1 | 1 | | 1 | | | 1 | 1 | | 1 | 889 |
| 207 | 1 | 1 | | 1 | | | 1 | 1 | 1 | | 890 |
| 208 | 1 | 1 | | 1 | | | 1 | 1 | 1 | 1 | 891 |

FIG. 33

| (a) INPUT LEVEL | \multicolumn{10}{c|}{WEIGHTS FOR SUBFIELDS} | (b') CONVERSION OUTPUT |
|---|---|---|---|---|---|---|---|---|---|---|---|
| | 10 (74) | 9 (56) | 8 (43) | 7 (33) | 6 (23) | 5 (13) | 4 (7) | 3 (4) | 2 (2) | 1 (1) | |
| 209 | 1 | 1 | 1 | 1 | 1 | 1 | 1 | | | | 892 |
| 210 | 1 | 1 | 1 | 1 | 1 | 1 | 1 | | | 1 | 893 |
| 211 | 1 | 1 | 1 | 1 | 1 | 1 | 1 | | 1 | | 894 |
| 212 | 1 | 1 | 1 | 1 | 1 | 1 | 1 | | 1 | 1 | 895 |
| 213 | 1 | 1 | 1 | 1 | 1 | 1 | | 1 | | | 949 |
| 214 | 1 | 1 | 1 | 1 | 1 | 1 | | 1 | | 1 | 950 |
| 215 | 1 | 1 | 1 | 1 | 1 | 1 | | 1 | 1 | | 951 |
| 216 | 1 | 1 | 1 | 1 | 1 | 1 | | 1 | 1 | 1 | 953 |
| 217 | 1 | 1 | 1 | 1 | 1 | 1 | 1 | | | | 954 |
| 218 | 1 | 1 | 1 | 1 | 1 | 1 | 1 | | | 1 | 955 |
| 219 | 1 | 1 | 1 | 1 | 1 | 1 | 1 | | 1 | | 956 |
| 220 | 1 | 1 | 1 | 1 | 1 | 1 | 1 | | 1 | 1 | 957 |
| 221 | 1 | 1 | 1 | 1 | 1 | 1 | 1 | 1 | | | 958 |
| 222 | 1 | 1 | 1 | 1 | 1 | 1 | 1 | 1 | | 1 | 959 |
| 223 | 1 | 1 | 1 | 1 | 1 | 1 | 1 | 1 | 1 | | 981 |
| 224 | 1 | 1 | 1 | 1 | 1 | 1 | 1 | 1 | 1 | 1 | 982 |
| 225 | 1 | 1 | 1 | 1 | 1 | 1 | 1 | | | | 983 |
| 226 | 1 | 1 | 1 | 1 | 1 | 1 | 1 | | | 1 | 985 |
| 227 | 1 | 1 | 1 | 1 | 1 | 1 | 1 | | 1 | | 986 |
| 228 | 1 | 1 | 1 | 1 | 1 | 1 | 1 | | 1 | 1 | 987 |
| 229 | 1 | 1 | 1 | 1 | 1 | 1 | 1 | 1 | | | 988 |
| 230 | 1 | 1 | 1 | 1 | 1 | 1 | 1 | 1 | | 1 | 989 |
| 231 | 1 | 1 | 1 | 1 | 1 | 1 | 1 | 1 | 1 | | 990 |
| 232 | 1 | 1 | 1 | 1 | 1 | 1 | 1 | 1 | 1 | 1 | 991 |
| 233 | 1 | 1 | 1 | 1 | 1 | 1 | 1 | | | | 997 |
| 234 | 1 | 1 | 1 | 1 | 1 | 1 | 1 | | | 1 | 998 |
| 235 | 1 | 1 | 1 | 1 | 1 | 1 | 1 | | 1 | | 999 |
| 236 | 1 | 1 | 1 | 1 | 1 | 1 | 1 | | 1 | 1 | 1001 |
| 237 | 1 | 1 | 1 | 1 | 1 | 1 | 1 | 1 | | | 1002 |
| 238 | 1 | 1 | 1 | 1 | 1 | 1 | 1 | 1 | | 1 | 1003 |
| 239 | 1 | 1 | 1 | 1 | 1 | 1 | 1 | 1 | 1 | | 1004 |
| 240 | 1 | 1 | 1 | 1 | 1 | 1 | 1 | 1 | 1 | 1 | 1005 |
| 241 | 1 | 1 | 1 | 1 | 1 | 1 | 1 | | | | 1006 |
| 242 | 1 | 1 | 1 | 1 | 1 | 1 | 1 | | | 1 | 1007 |
| 243 | 1 | 1 | 1 | 1 | 1 | 1 | 1 | | 1 | | 1010 |
| 244 | 1 | 1 | 1 | 1 | 1 | 1 | 1 | | 1 | 1 | 1011 |
| 245 | 1 | 1 | 1 | 1 | 1 | 1 | 1 | 1 | | | 1012 |
| 246 | 1 | 1 | 1 | 1 | 1 | 1 | 1 | 1 | | 1 | 1013 |
| 247 | 1 | 1 | 1 | 1 | 1 | 1 | 1 | 1 | 1 | | 1014 |
| 248 | 1 | 1 | 1 | 1 | 1 | 1 | 1 | 1 | 1 | 1 | 1015 |
| 249 | 1 | 1 | 1 | 1 | 1 | 1 | 1 | | | | 1017 |
| 250 | 1 | 1 | 1 | 1 | 1 | 1 | 1 | | | 1 | 1018 |
| 251 | 1 | 1 | 1 | 1 | 1 | 1 | 1 | | 1 | | 1019 |
| 252 | 1 | 1 | 1 | 1 | 1 | 1 | 1 | | 1 | 1 | 1020 |
| 253 | 1 | 1 | 1 | 1 | 1 | 1 | 1 | 1 | | | 1021 |
| 254 | 1 | 1 | 1 | 1 | 1 | 1 | 1 | 1 | | 1 | 1022 |
| 255 | 1 | 1 | 1 | 1 | 1 | 1 | 1 | 1 | 1 | 1 | 1023 |

IMAGE DISPLAY APPARATUS AND IMAGE EVALUATION APPARATUS

BACKGROUND OF THE INVENTION (1) Field of the Invention

This invention relates to an image display apparatus which uses a display panel, such as a plasma display panel, that displays images by a multi-level gray scale by dividing one TV field of the image into a plurality of subfields, and especially to an image display apparatus which displays images of improved quality. This invention also relates to an image evaluation apparatus which evaluates images displayed in such an image display apparatus.

(2) Description of the Prior Art

Image display apparatuses which use display panels based on a binary illumination system, namely, two illumination states in which each pixel can be ON or OFF, represented in this specification by plasma display panels (hereinafter simply referred to as "PDPs"), achieve gray scale displays by methods such as the Address Display Period Separated Sub-Field method. In this method, an image is displayed by dividing the time in one TV field into a plurality of subfields which are each composed of an addressing period in which ON/OFF data is written for each line of a PDP screen and a discharge sustaining period in which predetermined pixels are illuminated all at once.

It is conventionally known that when displaying a moving image in a multi-level gray scale by dividing each TV field of the moving image into a plurality of subfields, gray scale disturbance in the form of "false edge" appears on the screen.

The following is an explanation of an occurrence of such false edges when displaying a moving image. FIG. 35 shows movement of a picture pattern PA1 on a screen of a PDP 240, the picture pattern PA1 being composed of two pairs of adjacent pixels having the similar gray scale levels 127 and 128 respectively. In this example, the picture pattern PA1 moves horizontally by two pixels per TV field. In FIG. 36, the horizontal axis shows a relative position of each pixel on the screen, and the vertical axis shows a period which for convenience's sake corresponds to one TV field. FIG. 36 also shows how the movement of the picture pattern PA1 appears to a viewer. Here, a case is explained in which each piece of 8-bit data indicating one out of 256 gray scale levels is converted into a piece of 8-bit data showing ON/OFF states of eight subfields 1–8. The gray scale display is achieved in accordance with the ON/OFF states of the eight subfields. As a specific example, the time in one TV field is divided into subfields 1–8 which are assigned luminance weights, 1, 2, 4, 8, 16, 32, 64 and 128, respectively (in ascending order). In this case, the gray scale level 127 can be expressed by illuminating the subfields 1–7 (diagonally shaded areas on the left in FIG. 36) and not illuminating the subfield 8, while the gray scale level 128 can be expressed by not illuminating the subfields 1–7 and illuminating the subfield 8 (diagonally shaded area on the right in FIG. 36).

When displaying a still picture, the average luminance of one TV field of the observed image is expressed by the integral of the illumination periods between A–A' in FIG. 35, so that the desired gray scale level is properly displayed. On the other hand, when displaying a moving image, an integral of the illumination periods of either B–B' or C–C', depending on the direction followed by the eye, is observed on the retina. The total luminance weights assigned to each bit (subfield) between B–B' is approximately 0, while the total luminance weights assigned to each bit (subfield) between C–C' is approximately 255. Thus, when observing the movement of a picture pattern in which two similar gray scale levels, such as the gray scale levels 127 and 128, are adjacent, the boundary between the adjacent pixels of the gray scale levels appear profoundly disturbed as shown in FIG. 36.

As explained above, a halftone is represented by an integral of luminance values of each subfield in a time series. Accordingly, when the eye follows a moving image, luminance weights assigned to the subfields of different gray scale levels are integrated due to the position change. As a result, the halftone display appears profoundly disturbed. It should be noted here that this halftone disturbance appears as false edges in the image, and so generally referred to as the "moving image false edge." Such false occurrences in a moving image display are explained in detail in Hiraki Uchiike and Shigeru Mikoshiba, *All About Plasma Display*, Kogyo Chosakai Shuppan, (May 1, 1997), pp. 165–177.

In order to eliminate moving image false edges and reduce halftone disturbance in a moving image display, an attempt has been made with conventional image display apparatuses to divide the luminance weights of the subfields 7 and 8 as upper bits and intersperse the divided parts in the first and second halves of one TV field. FIG. 37 shows a subfield construction in a conventional method for reducing the moving image false edges by using ten subfields to display 8-bit gray scale levels, that is, 256 gray scale levels. The ten subfields are assigned luminance weights of 48, 48, 1, 2, 4, 8, 16, 32, 48, and 48 in order of time. That is to say, the combined luminance weight value of 64 and 128 for subfields 7 and 8 out of the eight subfields described above is divided into four equal luminance weights ((64+128)/4–192/4=48), which are then interspersed in the first and second halves of one field to prevent the occurrence of the halftone disturbance by reducing the luminance weights of the subfields of upper bits. With this technique, halftone disturbance is scarcely observed at the boundary between the adjacent pixels of gray scale levels 127 and 128 described above, so that the occurrence of the moving image false edges can be prevented for those values. However, for a different example, like the two pairs of adjacent pixels having gray scale levels 63 and 64 respectively shown in FIG. 37, halftone disturbance is inevitably observed at the boundary between the adjacent pixels. In the drawing, in the pixels of gray scale level 64, a subfield with a large luminance weight (here, the subfield 9) is turned ON while subfields with small luminance weights (here, the subfields 3, 4, 5, 6, and 8) are turned OFF. The distribution of ON/OFF subfields greatly changes from the previous pixels. As a result, halftone disturbance is inevitably observed at the boundary between the adjacent pixels. As shown in FIG. 37, the total luminance weights assigned to each bit (subfield) observed in the direction of the dotted line arrow Ya is approximately 79, while the total luminance weights assigned to each bit (subfield) observed in the direction of the dotted line arrow Yb is approximately 32. Thus, it is still not possible to prevent the occurrence of the moving image false edges in such a case.

Also, in the above-described method of evaluating the moving image false edge, the following problems are found. That is, in this method, all the luminance weights of the subfields on the dotted line arrow Ya or Yb shown in FIG. 37 are added up to detect the occurrence of the moving image false edge. In such a case, there is a possibility that the total luminance weights assigned to the subfields greatly change when the directions of the dotted line arrows slightly change due to the change of subfields included in these lines, as shown in the dotted line arrow Yc for Ya and Yd for Yb in the drawing. As described above, in the conventional method in which the luminance weights are added up based on a binary determination of ON/OFF subfields on a dotted line, only a slight change in the direction followed by the eye may generate a great difference in the result value of the total luminance weights which is used for the evaluation of the moving image false edge. This leads to a difference between the evaluation result and the actual image observed by a viewer.

Also, another problem of the conventional evaluation method is that the method does not cover slant movements of the image. That is, the conventional method responds only to the horizontal or vertical movement of the image.

Currently, the CRT displays are widely used as television displays. The CRT displays have been used as displays by a lot of users through a long period and the production cost is relatively low. Also, the CRT displays are highly evaluated for the quality of the luminance, contrast, etc. On the other hand, the CRT displays have disadvantages such as the largeness in their size or weight. These disadvantages hinder the use of the CRT displays as, for example, flat television sets which can be hung on a wall. PDPs or Liquid Crystal Displays (LCDs) have been in the spotlight as thin, lightweight displays. Recently, the LCDs, recognized to be suitable for small displays, have widely been used for note-type personal computers. However, it is still difficult to produce large LCDs. Also, another problem with the LCDs is that the display response characteristic is not satisfactory in displaying moving images, which leads to the occurrence of afterimages and the like. Compared to the LCDs, it is anticipated that the PDPs will be used as wall televisions in future since the PDPs are relatively suitable for large size.

In the usual CRT displays, when one electric beam hits one pixel, the pixel illuminates. At the same time, surrounding pixels also illuminate at a considerable level. This leads to the occurrence of a diffusion of image display and to the degradation of the spatial frequency characteristic. As to these problems, the PDPs and LCDs are given high evaluation that the image is clear. This is because the PDPs and LCDs are matrix-type displays which have a separate electrode for each pixel, helping the displays maintain independence of each piece of image display information for each pixel. However, the LCDs have a problem of afterimages due to the unsatisfactory display response characteristic, as described earlier. In contrast, the PDPs do not have the problem. As a result, the PDPs are highly appreciated as high-quality image display apparatuses all things considered.

Incidentally, in the conventional image display apparatuses using the PDPs, the same signal source and signal processing as the conventional CRT displays are used for the parts of the apparatuses other than the PDPs. As a result, noises included in the input image signals, especially two-dimensional high frequency component noises, are remarkable in the conventional PDP apparatuses, while such noises are not remarkable in the conventional CRT displays. The noises are marked especially in still pictures since they are minute.

SUMMARY OF THE INVENTION

It is therefore the first object of the present invention to provide an image display apparatus which can reduce occurrences of moving image false edges.

It is the second object of the present invention to provide an image evaluation apparatus which can evaluate images reflecting actual images observed by human eyes moving in any direction.

It is the third object of the present invention to provide an image display apparatus which can display excellent images without being disturbed by noise components of input image signals.

The first object can be fulfilled by setting the luminance weights as W1, W2, . . . and WN and by selecting, in accordance with a motion amount, a signal level (gray scale level) among those expressed by arbitrary combinations of 0, W1, W2, . . . and WN, and outputting the selected signal level as a display signal, where the motion amount is a change of the input image signal over time.

This technique is very effective in reducing occurrences of moving image false edges. It is needless to say that the effect of the above technique is further enhanced by adopting the assignment of luminance weights to the subfields and the arrangement of the subfields.

Here, the error between the input signal and the display signal can nearly be eliminated by calculating a difference between an input signal level and a signal level of a limited display signal and distributing the difference to surrounding pixels.

The above object can also be achieved by an image display apparatus in which one TV field is divided into N subfields arranged in time order which are respectively assigned luminance weights, and the initialization is performed (N-1) times for each TV field. With this construction, in proportionate to input signal levels in a predetermined range, illumination subfields extend forward or backward over time. This fulfills the first object to reduce occurrences of moving image false edges.

The second object is achieved by an image evaluation apparatus which sets a standard point to a pixel on a virtual image, calculates a course which is formed by a movement from the standard point to a point in a unit time, calculates illumination amounts of pixels which neighbor the course, adds up the illumination amounts, and generates evaluation information, from the total illumination amount, which shows a state of an image displayed on an image display apparatus.

With this image evaluation technique which takes illuminations of pixels neighboring the course into consideration, it is possible to eliminate an unstableness that the evaluation image greatly changes when the original image makes only a slight movement, and provide stable images reflecting actual images observed by human eyes.

The third object is fulfilled by an image display apparatus which suppresses components that change radically over time among high-frequency components in spatial frequencies of an input image signals.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 is a block diagram showing the construction of the second encoding unit 7;

Figures 5A, 5B:
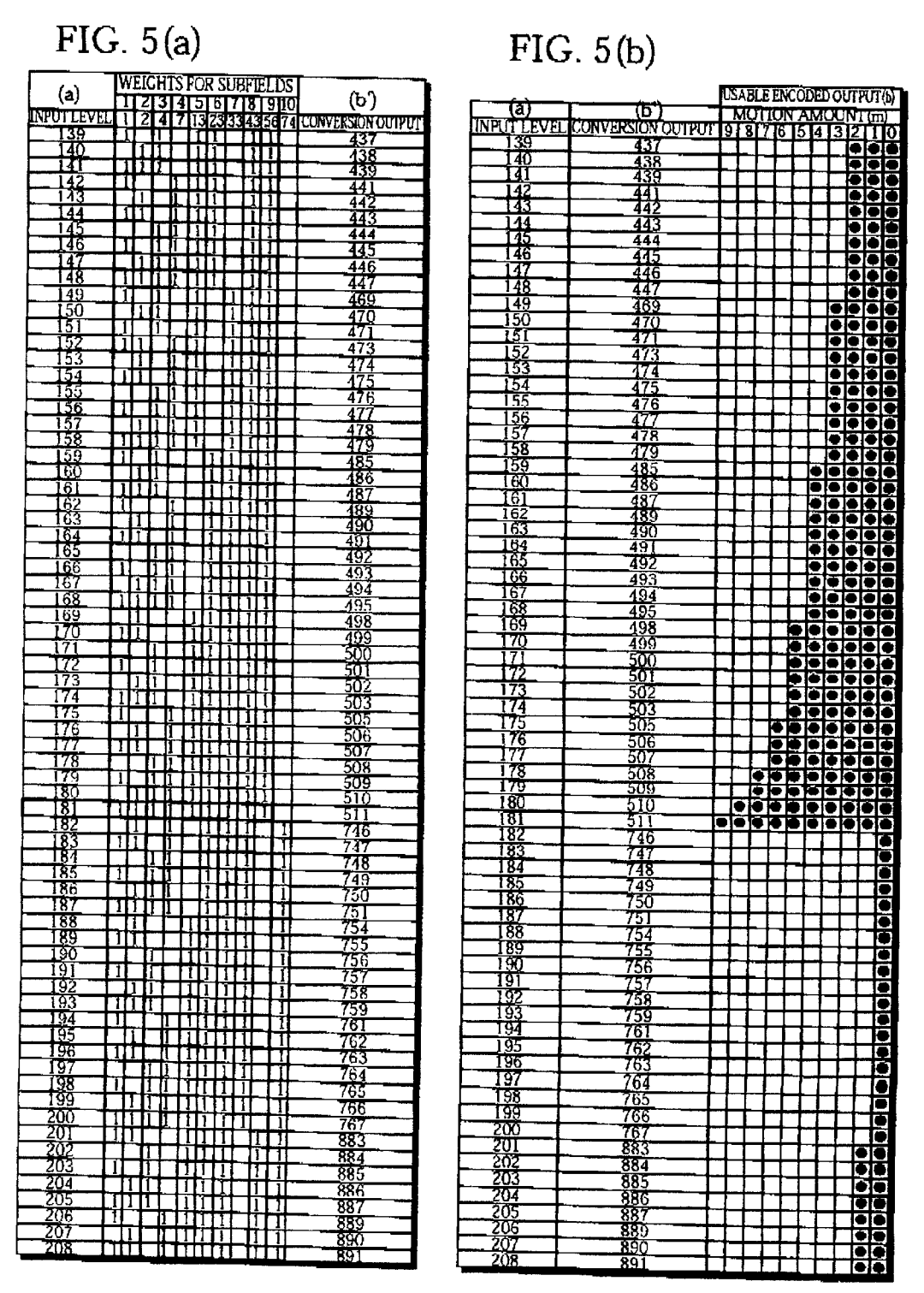
Figures 6A, 6B:
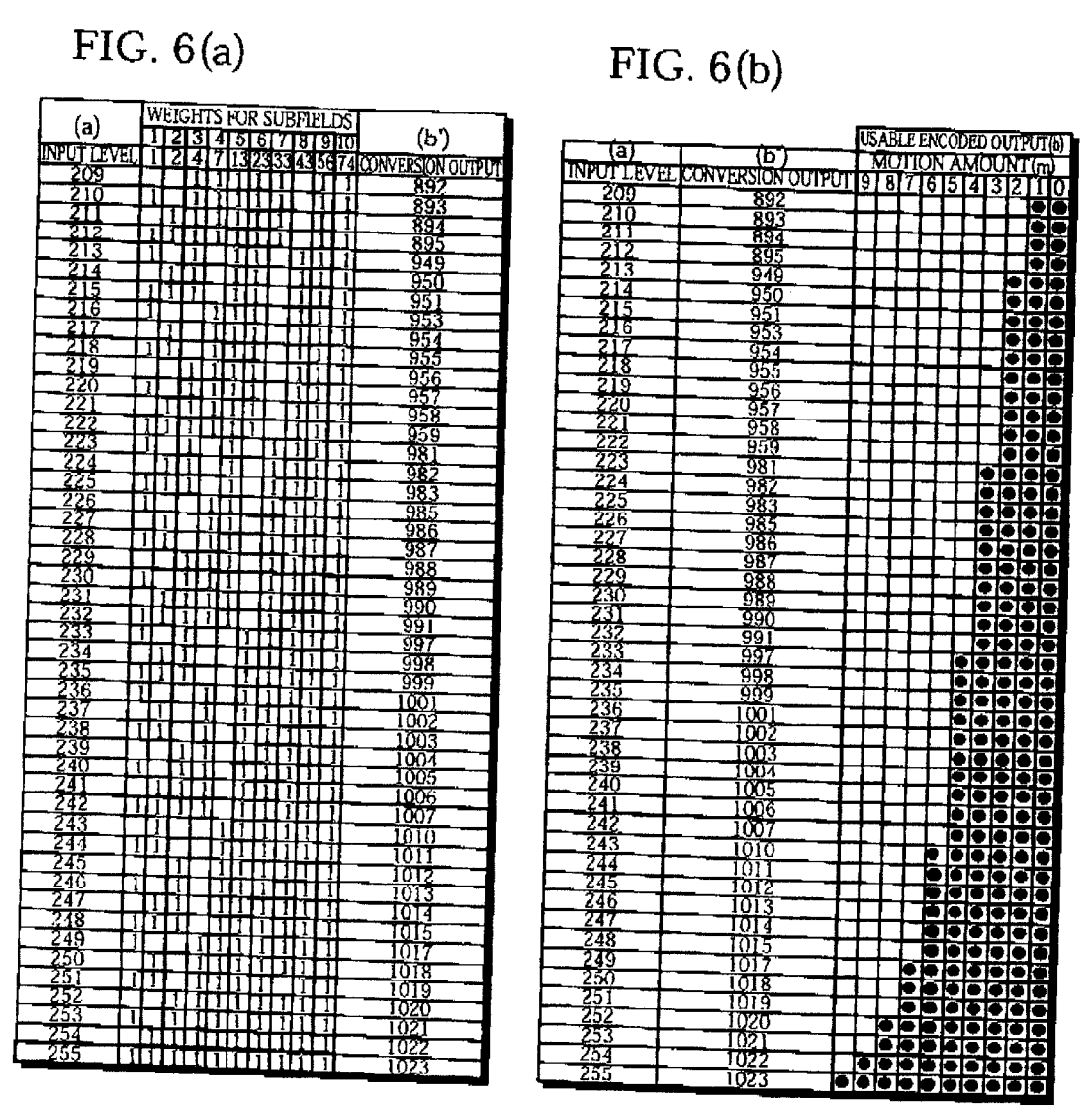

FIGS. 3(a), 4(a), 5(a), and 6(a) show the subfield conversion table 710;

FIGS. 3(b), 4(b), 5(b), and 6(b) show the conversion table 60;

FIG. 7 shows the internal construction of the frame memories of the image display apparatus;

FIG. 12 is a schematic representation of generation of output signals by the motion amount calculating unit of the image display apparatus;

FIG. 15 shows a table used by the fourth encoding unit of the image display apparatus;

FIG. 25 shows data showing correspondence between pixels positions and subfield information;

FIG. 26 shows data showing correspondence between pulse illumination times and subfields;

FIG. 27 shows data used by the first encoding unit;

FIG. 28 shows data used by the first encoding unit;

FIG. 29 shows data used by the first encoding unit;

FIGS. 30, 31, 32, and 33 show a table which corresponds to the subfield conversion table 710;

DESCRIPTION OF THE PREFERRED EMBODIMENTS

Embodiment 1

Figure 1:
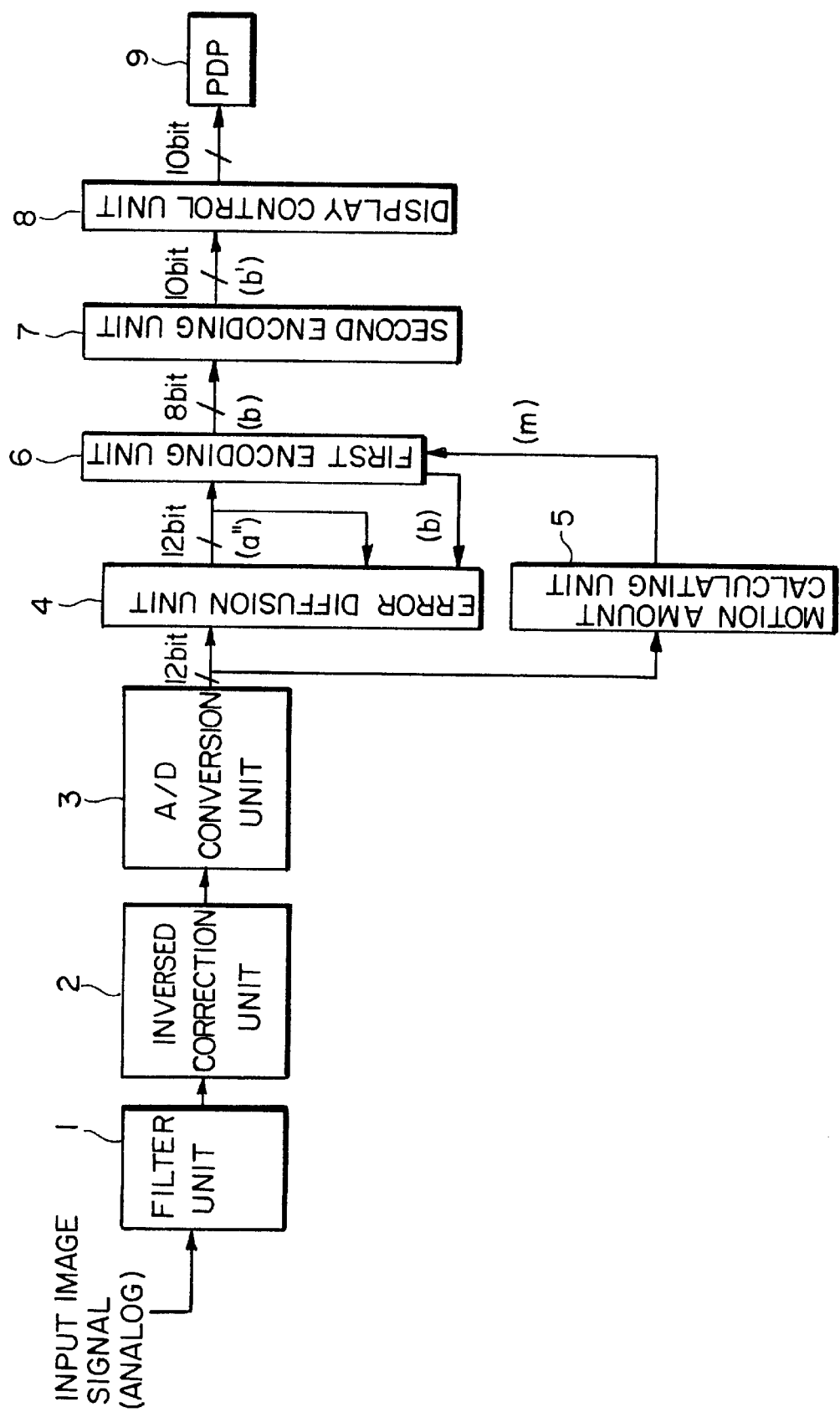
FIG. 1 is a block diagram showing the construction of the image display apparatus of Embodiment 1.

FIG. 1 is a block diagram showing the construction of the image display apparatus of the present embodiment.

As shown in FIG. 1, the image display apparatus of the present embodiment is composed of a filter unit 1, a γ inversed correction unit 2, an A/D conversion unit 3, an error diffusion unit 4, a motion amount calculating unit 5, a first encoding unit 6, a second encoding unit 7, a display control unit 8, and a PDP 9.

The PDP 9 is a display device provided with electrodes so that the screen is a matrix of 640 pixels×480 lines, for example, with each pixel having two states of illumination that are namely "on" and "off". Here, gray scale levels can be displayed by expressing each gray scale level as a total of the illumination values for a predetermined time period, namely, a predetermined number of subfields (e.g., 10 subfields), where each subfield is assigned a predetermined number of illumination pulses as a weight. A PDP for monochrome display is described in the present embodiment to simplify the explanation, though the technique of the present embodiment can also be applied to the processing of each color in PDPs for color display which generate pixels using the three colors red (R), green (G), and blue (B).

The filter unit 1, a circuit for removing high-frequency components from spatial frequencies, will be detailed later.

The γ inversed correction unit 2 is a circuit for correcting the γ characteristic (normally, γ=2.2) which is added to the original analog image signals assuming that the signals are displayed on a CRT. With this correction, the original input signals and the display signals have a linear input/output relationship (γ=1).

The A/D conversion unit 3 is a circuit for converting the analog image signals to 12-bit image signals.

FIG. 2 is a block diagram showing the construction of the second encoding unit 7.

As shown in the drawing, the second encoding unit 7 is composed of a subfield conversion unit 71, a write address control unit 72, a frame memory 73a, and a frame memory 73b.

The write address control unit 72 generates an addressing signal based on a horizontal synch signal and a vertical synch signal which have been separated from the input image signal.

The subfield conversion unit 71 is a circuit which converts each digital image signal corresponding to a pixel into a piece of field information. Prior to this process, the first encoding unit 6 discards the lower four bits of 12-bit signals (a") to generate 8-bit signals (a'), converts the 8-bit signals (a') to the digital image signals (b), and outputs the digital image signals (b). Accordingly, the second encoding unit 7 receives 8-bit digital image signals (b) from the first encoding unit 6.

Each piece of field information, corresponding to a pixel, is divided into 10 pieces of 1-bit subfield information, each of which indicates ON/OFF of the corresponding pixel during one TV field. Here, the subfield conversion unit 71 includes in itself a subfield conversion table 710. The subfield conversion unit 71 refers to the table to assign any of 10 subfields, SF1 to SF10, to each input digital image signal in accordance with the gray scale level of the signal, where the subfields SF1 to SF10 are respectively assigned weights "1," "2," "4," "7," "13," "23," "33," "43," "55," and "74." This subfield-assigning process for each pixel is carried out in synchronization with a pixel clock which is generated by a PLL circuit (not illustrated). Then a physical address is specified for the generated field information corresponding to each pixel by the addressing signal output from the write address control unit 72. The field information is written into the frame memories 73a and 73b for each line, each pixel, each field, and each screen.

FIGS. 3(a), 4(a), 5(a), and 6(a) show the subfield conversion table 710. As shown in these drawings, the subfield conversion table 710 is used for converting each image signal into a piece of field information, where each piece of field information is divided into 10 pieces of subfield information. Each piece of subfield information indicates ON or OFF of the pixel at a corresponding subfield, one of SF1 to SF10. The subfields SF1 to SF10 are respectively assigned weights "1," "2," "4," "7," "13," "23," "33," "43," "55," and "74." In the table, the left-hand column shows input levels, namely, values of 8-bit digital image signals (a'). The table shows, for each input level, a piece of field information and a conversion-result value. Boxes having value "1" indicate that the pixels are ON at the subfields, while boxes without the value indicate that the pixels are OFF at the subfields.

For example, on receiving a digital image signal whose input level is "27" (with X sign in the table), the subfield conversion unit 71 converts the image signal into field information "1111100000" based on the subfield conversion table 710 and outputs 10-bit data corresponding to the converted field information. The value "31" shown in a corresponding box in the right-hand column is a decimal notation of "0000011111" which is a reversed binary value of the field information "1111100000."

FIG. 7 shows the internal construction of the frame memories 73a and 73b. As shown in the drawing, the frame memory 73a is provided with a first memory area 73a1 and a second memory area 73a2. The first memory area 73a1 stores field information covering former L lines of one screen (line 1 to line L). In the present embodiment, L is "240." The second memory area 73a2 stores field information covering former L lines of another screen (line 1 to line L). The first memory area 73b1 stores field information covering latter L lines of one screen (line L+1 to line 2L). The second memory area 73b2 stores field information covering latter L lines of another screen (line L+1 to line 2L).

Each of the memory areas 73a1, 73a2, 73b1, and 73b2 is composed of 10 subfield memories, SFM1–SFM10. With this construction, each memory area, in total, stores field information covering two screens for each of the 10 subfields, with each piece of subfield information indicating ON/Off of a corresponding pixel. In the present embodiment, a semiconductor memory of "one-bit-input, one-bit-output" type is used as each of the subfield memories, SFM1–SFM10. The frame memories 73a and 73b are two-port frame memories which are capable of simultaneously writing field information into themselves and reading field information to the PDP 9.

Field information is alternately written into the memory areas 73a1, 73a2, 73b1, and 73b2, such that field information of a former half of a present screen is written into the first memory area 73a1; a latter half of the screen is written into the first memory area 73b1; a former half of another screen is written into the second memory area 73a2; and a latter half of the screen is written into the second memory area 73b2. In writing field information into one memory area (73a1, 73a2, 73b1, or 73b2), each bit of the 10-bit data output from the subfield conversion unit 71 in synchronization with the pixel clock is sequentially written into the subfield memories, SFM1–SFM10. Here, it is predetermined which of 10 bits is to be stored into which of the subfield memories, SFM1–SFM10.

More specifically, the subfield numbers, "1" to "10," in the subfield conversion table 710 in the second line are logically associated with the subfield memories SFM1–SFM10. Accordingly, the 10 bits of the 10-bit data are written into respective subfield memories out of SFM1–SFM10. A write position of the 10-bit data in the subfield memories SFM1–SFM10 is specified by the addressing signal outputted from the write address control unit 72. Usually, the 10-bit data is written into the same position as the position of the pixel signal on the screen before the pixel signal is converted into the 10-bit data.

Figure 8:
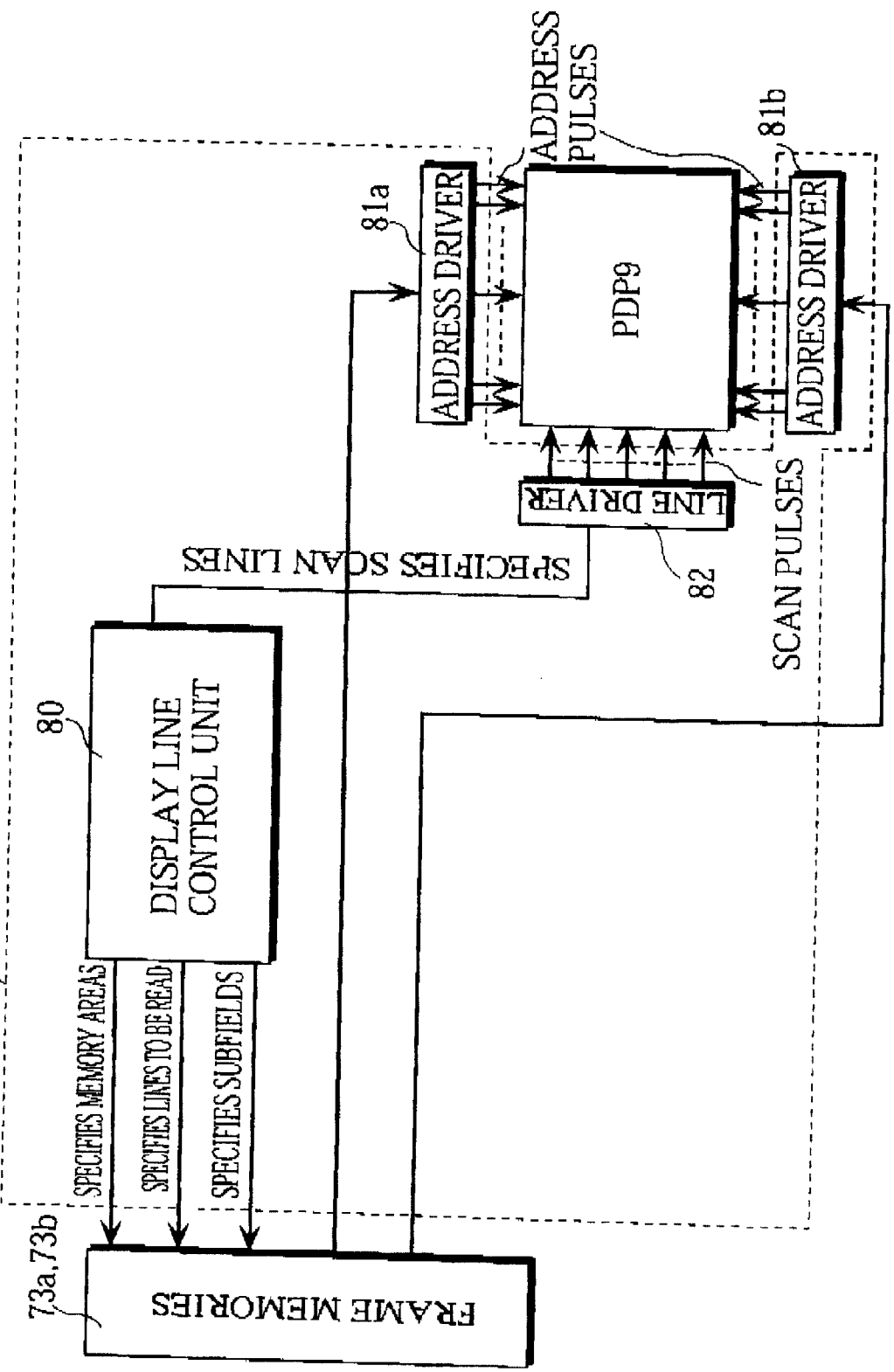
FIG. 8 is a block diagram showing the construction of the display control unit of the image display apparatus.

As shown in FIG. 8, the display control unit 8 is composed of a display line control unit 80, an address driver 81a, an address driver 81b, and a line driver 82.

The display line control unit 80 tells the frame memories 73a and 73b which memory area (73a1, 73a2, 73b1, or 73b2), line, and subfield should be read to the PDP 9, and tells the PDP 9 which line should be scanned.

The operation of the display line control unit 80 is synchronized, in a screen unit, with the operation of writing data into the frame memories 73a and 73b by the second encoding unit 7. That is to say, the display line control unit 80 does not read data from memory areas 73a1 and 73b1 (73a2 and 73b2) into which 10-bit data is being written, but reads data from the other memory areas 73a2 and 73b2 (73a1 and 73b1) into which 10-bit data has already been written.

The address driver 81a converts subfield information into address pulses in parallel in units of lines, each line having 640 bits, and outputs the address pulses as a line in the former part of a screen. Note that the 640-bit subfield information is serially input to the address driver 81a in one-bit unit in accordance with memory area specification, line specification, and subfield specification by the display line control unit 80. The address driver 81b converts subfield information into address pulses in parallel in units of lines, and outputs the address pulses as a line in the latter part of the screen.

The line driver 82 generates scan pulses to specify lines into which the subfield information is to be written.

With this construction of the display control unit 8, field information is read from the frame memories 73a and 73b to the PDP 9 as follows. For reading the field information, two pieces of data for the former half and the latter half of one screen are simultaneously read from the frame memories 73a and 73b, respectively. First, field information is read from the two subfield memories SFM1 simultaneously. Starting from the first line, subfield information for each pixel is read bit by bit, in order from one line to another from the memory areas 73a1 and 73b1 for two parts of a screen, simultaneously. After the first line is specified by the line driver 82, latent images are formed (addressing is carried out) on the first lines of the former and latter parts of the screen. Similarly, the process is repeated for each pair of lines, outputting the subfield information to PDP 9 in parallel and carrying out the addressing, until the last pair of lines for the respective parts of the screen are completed, when each pixel on the screen is simultaneously illuminated.

Similarly, ON/OFF subfield information for the subfield SF2 for each pixel of each line is read from the subfield memory SFM2, and each addressing is carried out. The same operation is successively repeated for the rest of the subfields. On completing this operation for all of the subfields SF1–SF10 for the first memory areas 73a1 and 73b1, the read-out (writing) of field information for one screen ends.

Figure 9:
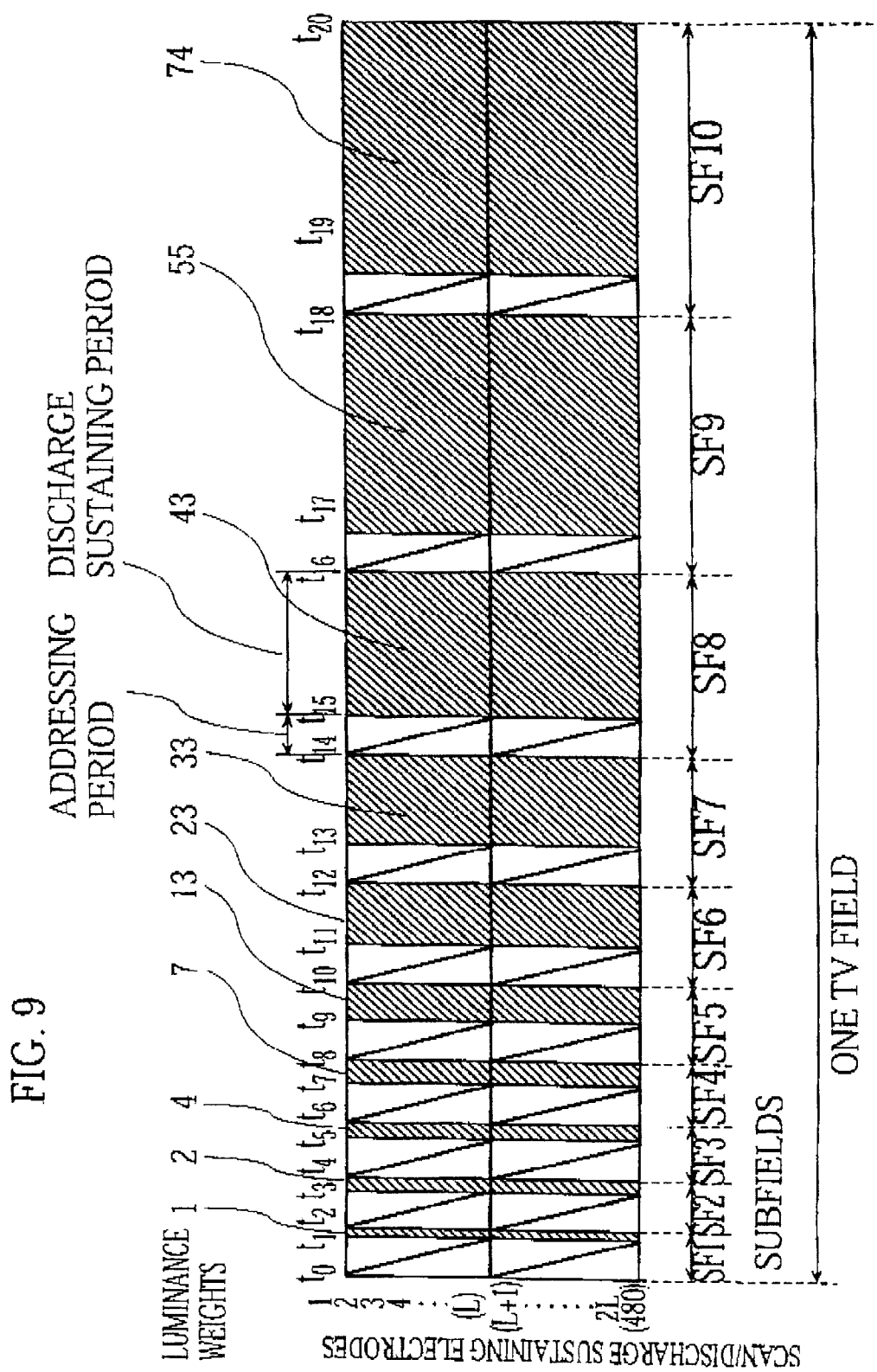
FIG. 9 shows the illumination method of the PDP of the image display apparatus.

FIG. 9 shows the operation of the PDP 9. In FIG. 9, the horizontal axis shows time, while the vertical axis shows scan/discharge sustaining electrode numbers, the electrodes running across the PDP. Also, a thick slanted line shows an addressing period in which addressing of pixels to be illuminated is carried out, while a shaded area shows the discharge sustaining period for which illumination of the pixels is carried out. That is to say, addressing is performed for all pixels for the scan/discharge sustaining electrode 1 by applying address pulses to the addressing electrodes in the vertical axis of the PDP at the start of the subfield SF1. On completing the addressing of the scan/discharge sustaining electrode 1, the same addressing processing is repeated for the electrode 2, 3, . . . , and the last electrode. Completion of the addressing of the last scan/discharge sustaining electrode is followed by the discharge sustaining period t1–t2. During this period, a number of discharge sustaining pulses proportional to the weighting of the subfield SF1 are applied to each discharge sustaining electrode, wherein only pixels which have been specified by the addressing as being illuminated are illuminated. By repeating the addressing and subsequent simultaneous illumination of pixels for all ten subfields, a gray-level display of one field is completed. It should be noted here that each addressing is carried out after an initialization period for eliminating wall charges of all pixels. Such a driving method, in which information is previously written into the pixels to be illuminated (addressing), is called "memory driving method."

By reading field information covering the next screen from other memory areas in parallel with the read-out for the current screen, a moving image is displayed.

Now, the characteristics of the encoding by the second encoding unit 7 are described.

In the subfield conversion table 710, the number of subfields is ten. The subfields are respectively assigned weights of 1, 2, 3, 4, 7, 13, 23, 33, 43, 55, and 74 in order of time, as shown in FIGS. 3($a$), 4($a$), 5($a$), and 6($a$).

In this type of weighting, it is possible to express the luminance of high-order (i.e., great) weights by combining a plurality of low-order (i.e., small) weights. That means, there are cases in which several subfield combinations are possible for displaying a certain gray scale level. For instance, when displaying a digital image signal whose level is 127, a combination of subfields SF10, SF8, SF4, SF2, and SF1, a combination of SF1, SF2, SF10, SF11, and SF12, a combination of SF9, SF8, SF6, SF3, and SF2, and a combination of SF9, SF7, SF6, SF5, SF2, and SF1 are possible.

Among a plurality of possible subfield combinations for representing one gray scale level, one combination is given in the subfield conversion table 710. For the digital image signal of input level 127, the combination of SF9, SF7, SF6, SF5, SF2, and SF1 is given in the table.

It can be said that combinations which minimize the use of subfields with high-order weights are given in the subfield conversion table 710. As shown in the subfield conversion table 710 in FIGS. 3($a$), 4($a$), 5($a$), and 6($a$), such combinations are used for gray scale levels of middle to high luminance (23–255), excluding gray scale levels of low luminance (0–22).

Also, the following characteristic can be seen in the table. That is, when a subfield with heavier weight is newly turned ON as the input level increases, the subfield with the heaviest weight in the preceding lower input levels is turned OFF. Refer to the table for such instances, such as subfield combinations for input levels 27 and 28, 50 and 51, 83 and 84, 126 and 127, and 181 and 182.

By using such subfield combinations to display an image, radical changes in luminance in a time series are suppressed. This leads to reduction or disappearance of moving image false-edges.

The following are detailed description of characteristics of the present invention.

Figure 10:
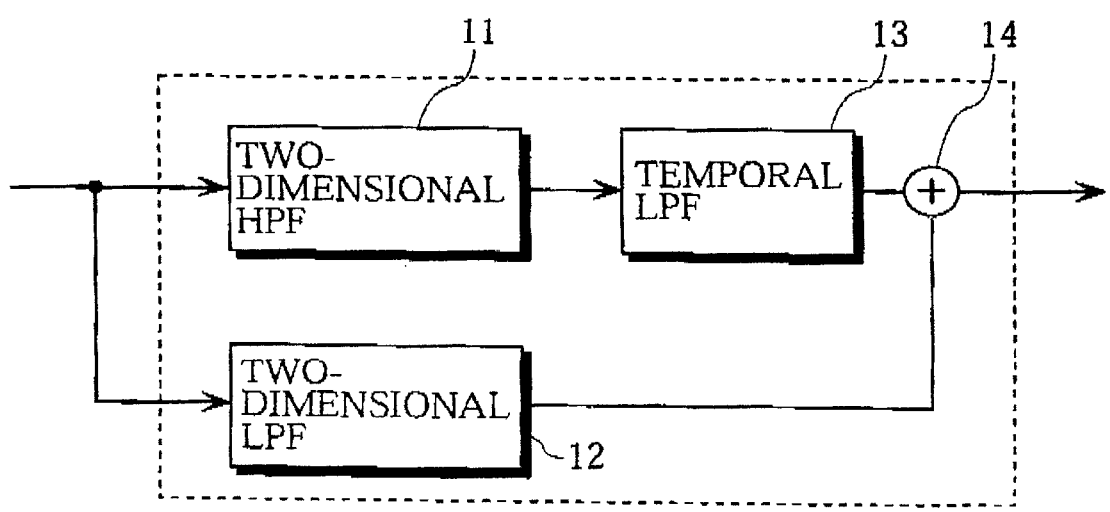
FIG. 10 is a block diagram showing the construction of the filter unit of the image display apparatus.

As shown in FIG. 10, the filter unit 1 is composed of a two-dimensional high pass filter 11, a two-dimensional low pass filter 12, a temporal LPF 13 being a time response low pass filter, and an addition unit 14.

The two-dimensional high pass filter 11 outputs image components with minute patterns. Of the output image components, components with radical changes in a time series are suppressed by the temporal LPF 13. The temporal LPF 13 outputs the image components to the addition unit 14.

The addition unit 14 combines the outputs of the temporal LPF 13 and the two-dimensional low pass filter 12. As a result, image components with minute patterns in the input image signals are finally displayed, with the components with radical changes in a time series being suppressed. Thus, components with minute patterns to change in short periods are not displayed. This prevents noises from being displayed. Note that still picture parts are displayed while high-quality image information of the still picture parts are preserved. As a result, both moving and still pictures are displayed with little noise. This is because the high-quality image information is retained for the still pictures and that the response characteristic is not damaged at low spatial frequencies which occupy a large area in the screen when moving pictures are displayed.

The first encoding unit 6 discards the lower four bits of 12-bit signals (a") to generate 8-bit signals (a'), converts the 8-bit signals (a') to the digital image signals (b), and outputs the digital image signals (b) to the second encoding unit 7. The first encoding unit 6 converts input levels a' to certain levels b by referring to the conversion table 60 shown in FIGS. 3($b$), 4($b$), 5($b$), and 6($b$). The first encoding unit 6, in its encoding process, sacrifices the gray scale level display characteristic and gives priority to reduction of moving image false edges as the amount of image movement increases. Note that the reason for using upper eight bits out of 12 bits of the original signals is to increase the number of false gray scale levels to be displayed.

The conversion table 60 shows selectable signal levels (gray scale levels) for each motion amount (0–9). In the table, the left-hand column shows signal levels, namely, values of 8-bit digital image signals (a') which also are selectable gray scale levels. The right-hand column shows the corresponding motion amounts (m) which are used to select output signal levels (gray scale levels). The ● sign indicates a motion amount. Each line of ● signals indicates a gray scale level which can be selected for each of the motion amounts included in the line. Note that the first encoding unit 6 receives signals from frame memories (not illustrated) storing at least image signals of two frames, where each frame corresponds to one screen for a time period of one field. This is because the motion amount calculating unit calculates motion amounts in parallel with the encoding process of the first encoding unit 6, and that motion amount calculation is performed using image signals of two successive frames.

The motion amount calculating unit 5 is composed of a frame memory 51$a$, a frame memory 51$b$, a motion amount detecting unit 52, a slant block detecting unit 53, and a motion amount correcting unit 54.

The motion amount detecting unit 52 compares image signals in the frame memory 51$a$ with those in the frame memory 51$b$ for each pixel. When the difference value obtained from the comparison exceeds a predetermined value, the case is regarded as a motion. The difference value is classified into a predetermined number of representative values, namely motion amount values. In the present embodiment, it is classified into 10 motion amount values, "0000" to "1001," where "0000" indicates no motion amount. The motion amount detecting unit 52 outputs these four-bit values as the motion amount values. High motion amount values indicate great motions (changes) in the corresponding pixels of two frames.

The slant block detecting unit 53 detects slant blocks from the same frame, where the slant blocks include adjacent pixels between which the signal values for the pixels change. The slant blocks are differentiated from the edge blocks which include adjacent pixels between which the signals change greatly. The slant block detecting unit 53 outputs a four-bit value "1111" for a slant block pixel, and outputs a value "0000" for an edge block pixel, a pixel having no change, and a "flat block" pixel having only a slight change. Note that a known edge detecting filter is used as the slant block detecting unit 53. The known edge detecting filter detects a slant angle for the horizontal and vertical directions and determines the presence of a slant block based on the angle in any of the directions.

The motion amount correcting unit 54 receives the motion amount values from the motion amount detecting unit 52 and corrects the values based on the corresponding outputs received from the slant block detecting unit 53, and outputs the corrected motion amount values. The correction is made as follows: when motion amount value "0000" is received, value "0000" is output regardless of the output from the slant block detecting unit 53; when any motion amount value out of "0000" to "1001" is received from the unit 52 and value "1111" is received from the slant block detecting unit 53, the received motion amount value is output as it is; and when any motion amount value out of "0000" to "1001" is received from the unit 52 and value "0000" is received from the slant block detecting unit 53, value "0000" is output. The reason for the last process of the above is that even if there is a motion, image patterns of the edge block or the flat block do not occur as the moving image false-edges. That is, in this case, the first encoding unit 6 gives priority to the gray scale level. Note that the motion amount value m is represented by the decimal notation in the following description and in the conversion table 60 shown in FIGS. 3(b), 4(b), 5(b), and 6(b) to simplify the explanation.

Figure 11:
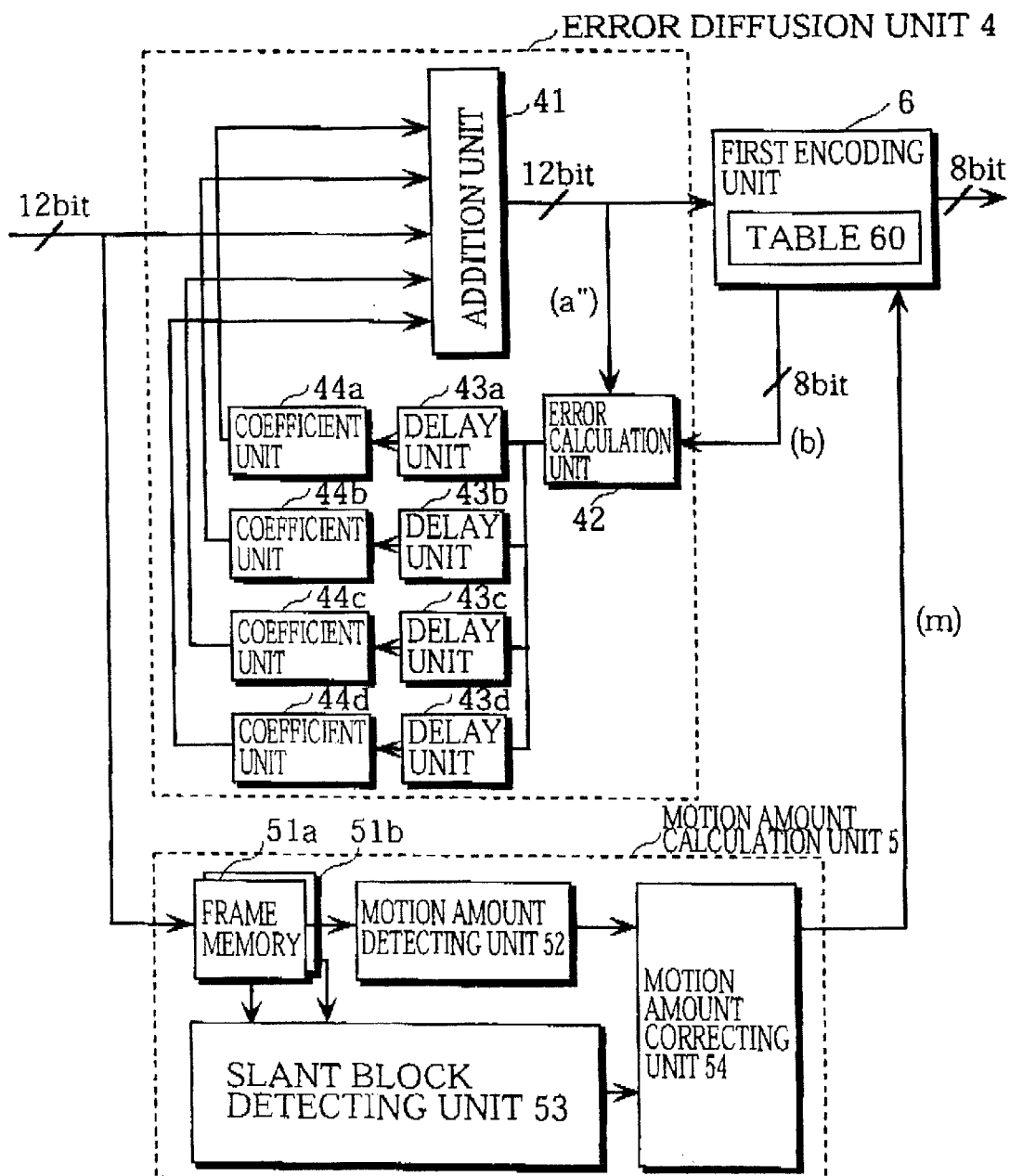
FIG. 11 is a block diagram showing the construction of the error diffusion unit and the motion amount calculating unit of the image display apparatus.

As shown in FIG. 11, the error diffusion unit 4 is composed of an addition unit 41, an error calculation unit 42, delay units 43a–43d, and coefficient units 44a–44d.

The error calculation unit 42 calculates a difference c between the 8-bit level b output from the first encoding unit 6 and level a" of a 12-bit input signal a".

The delay unit 43a delays the difference c by one pixel (1D). The delay unit 43b delays the difference c by (one line (1H)+one pixel (1D)). The delay unit 43c delays the difference c by line (1H). The delay unit 43d delays the difference c by (one line (1H)–one pixel (1D)).

The coefficient units 44a–44d assign a value to the difference value c in accordance with a corresponding coefficient. The addition unit 41 adds the assigned value to the input signal level, and outputs the processed signal to the first encoding unit 6. Generally, such a method is called error diffusion method. Accordingly, after this process, the first encoding unit 6 receives the signal a" which has an addition result of an input level of the previous input signal and the assigned value. Note that the error diffusion process is performed for both moving and still images. This is because an error is detected even in still images due to the discard of four bytes executed by the first encoding unit 6.

Now, the operations of the first encoding unit 6 and the error diffusion unit 4 are described in detail.

As understood from a comparison of the subfield conversion table 710 shown in FIGS. 3(a), 4(a), 5(a), and 6(a) with the conversion table 60 shown in FIGS. 3(b), 4(b), 5(b), and 6(b), there are correlation between these tables.

The first encoding unit 6 converts each input signal level (gray scale level) into a certain output signal level (gray scale level) by referring to the conversion table 60. As shown in the tables 710 and 60, the highest motion level (m=9) corresponds to the signal levels with the combinations of subfields that do not illuminate or subfields that illuminate successively, that is signal levels 0, 1, 3, 7, 14, 27, 50, 83, 126, 181, and 255 (boxes outlined by a thick line in the table 710), which is the case in which the moving image false edge occurs in the least. As a result, when receiving a signal level with motion amount 9, the first encoding unit 6 outputs one signal level (gray scale level) selected from 0, 1, 3, 7, 14, 27, 50, 83, 126, 181, and 255 which is close to the input signal level. As for the signal levels with motion levels lower than the maximum motion amount (m=9), the first encoding unit 6 selects a signal level in proportionate to the luminance weight assigned to a subfield which turns ON after an OFF-subfield. More specifically, the first encoding unit 6 selects a signal level including an ON-subfield with a larger luminance weight succeeding to an OFF-subfield as the first encoding unit 6 receives a signal level with a smaller motion amount, that is they are in an inverse proportion. Such signal levels including ON-subfields with large luminance weights will tend to generate the moving image false edge if they have large motion amounts. Thus, this arrangement contributes to suppressing of the occurrence of the moving image false edge. In other words, as the motion amount of the input signal level increases, the first encoding unit 6 selects a signal level with a long successive illumination time.

In such an encoding process, namely, a signal level selection in proportion to a motion amount value, the moving image false edge is suppressed with a high accuracy when the motion amount is large. Also, the number of selectable gray scale levels increases as the motion amount decreases, where the possibility of the occurrence of the moving image false edge decreases. Accordingly, the first encoding unit 6 selects one out of maximum number of 256 gray scale levels as an output signal level for each input signal of a still picture whose motion amount is "0". That is, for an input signal of a still picture or having little motion, where the motion amount m is "0," as indicated by the ● signs in the conversion table 60 shown in FIGS. 3(b), 4(b), 5(b), and 6(b), all of the 256 types of gray scale levels are available for the output signal levels. Hence, in case of a still picture, the following equation holds:

input $a'$=encoded output $b$.

Thus, the still pictures are displayed with 256 gray scale levels.

As the motion amount m increases, the number of selectable gray scale levels decreases. When the motion amount m is maximum "9," the number of selectable gray scale levels is eleven, the selectable gray scale levels being 0, 1, 3, 7, 14, 27, 50, 83, 126, 181, and 255, as described earlier. The number of selectable gray scale levels is determined as follows. The gray scale levels 1, 3, 7, 14, 27, 50, 83, 126, 181, and 255 are respectively assigned weights W1 to W10. The number of selectable gray scale levels is therefore 11 including signal level 0. In this way, the number of selectable gray scale levels is expressed as N+1 when the weights range from W1 to WN. The number of selectable gray scale levels is increased as the motion amount decreases.

The first encoding unit 6 selects a signal level which is close to an input signal level (a') based on the conversion table 60. For example, for motion amount "9," the first encoding unit 6 selects signal level 1 for input signal levels 1–2, selects level 3 for input signal levels 3–6, selects level 7 for input signal levels 7–13, selects level 14 for input signal levels 14–26, selects level 27 for input signal levels 27–49, selects level 50 for input signal levels 50–82, selects level 83 for input signal levels 83–125, selects level 126 for input signal levels 126–180, selects level 181 for input signal levels 181–254, and selects level 255 for input signal level 255.

As a result, in this case of 11 types of illuminations, as the input signal level increases, the number of successive ON subfields increases, that is, the time period of continuous illumination extends (see boxes outlined by a thick line in the table 710). That indicates that the correlation between the largeness of the input signal level and the illumination pattern is secured. That is to say, the pixel corresponding to the signal keeps on illuminating in proportionate to the largeness of the input signal level. This is a simple relationship. In such a case, the distribution of ON/OFF subfields, namely illumination pulses as the weights, extends in a simple manner as the signal level increases. By using such limited illumination patterns, the occurrence of the moving image false edge can be suppressed.

Such a simple correlation between the largeness of the input signal level and the illumination pattern holds for a case where the motion amount value ranges from 1 to 8. In this case, the number of selectable signal levels for small motion amount values is larger than the case of motion amount values 0 to 9. As a result, the illumination pattern may change rather radically over time. The number of selectable signal levels increases as the motion amount value decreases. This is because the change in the ON/OFF subfield distribution less affects the occurrence of the moving image false edge when the motion amount is small than when the motion amount is large.

Figure 13:
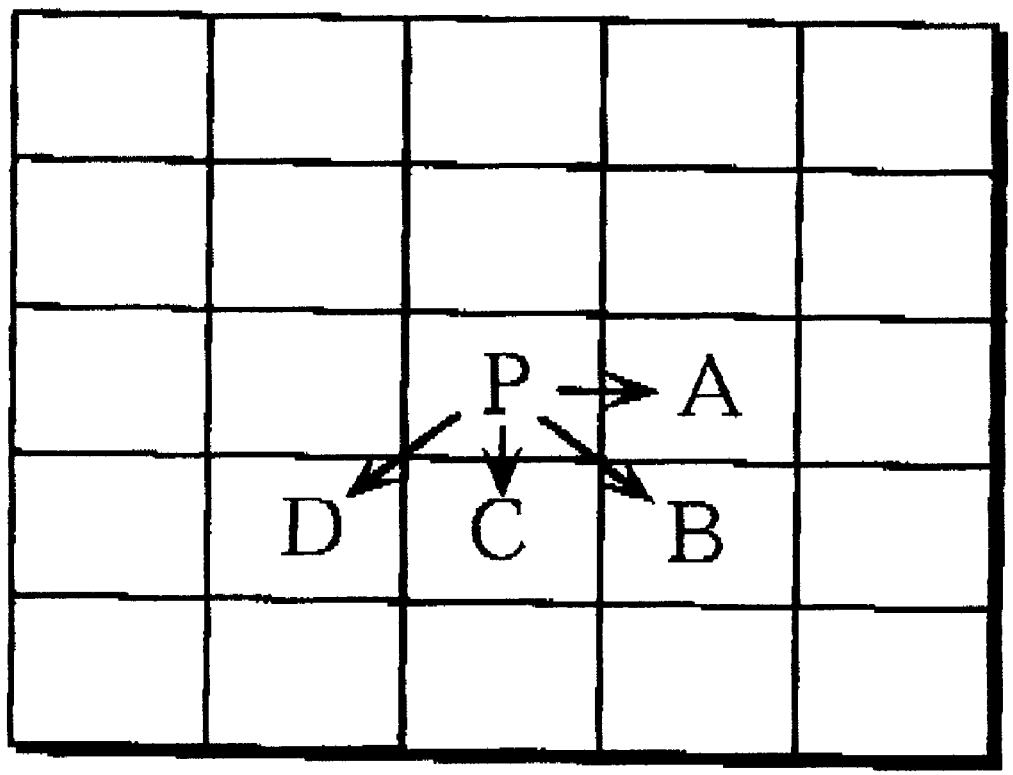
FIG. 13 is a schematic representation of the error diffusion method of the image display apparatus.

Incidentally, it may seem that 11 selectable gray scale levels, as one example which is the case of the maximum motion amount, are insufficient to display images that appear natural, though the occurrence of the moving image false edge may be suppressed. The error diffusion unit 4 performs the error diffusion process to solve this problem. That is, the error diffusion unit 4 distributes the error c, which is obtained as the difference between input signal level (a") and encoded output signal level (b), to adjacent pixels to reduce the mean error. More specifically, as shown in FIG. 13, the error diffusion unit 4 obtains error c for pixel P, and distributes the obtained error c to the adjacent pixels A, B, C, and D. The distribution coefficients are determined as follows for example: 7/16 of the error c is distributed to pixel A, 1/16 to pixel B, 5/16 to pixel C, and 3/16 to pixel D. The original image signals are encoded again after the distributed error is added to the signals. By repeating this process, newly obtained errors are distributed to adjacent pixels in succession, and the mean display luminance becomes almost equal to the mean luminance of the input signals. This compensates the gray scale display.

It should be noted here that the error to be distributed is large when the motion amount is large, and that such errors may appear to be noises. However, in the actual viewing, the eye moves as it follows a moving image. Therefore, the viewer can view the displayed image, almost unannoyed by the noises generated by the error distribution.

In case of the still pictures, the noises, what is called diffusion error, are not observed since 256 gray scale levels are available for the encoded output signal (b). Also, the error diffusion process is performed using 12-bit data for calculation, and the process is also performed for still pictures. Accordingly, it is possible to use more than 256 false gray scale levels for the still picture areas.

Embodiment 2

Figure 14:
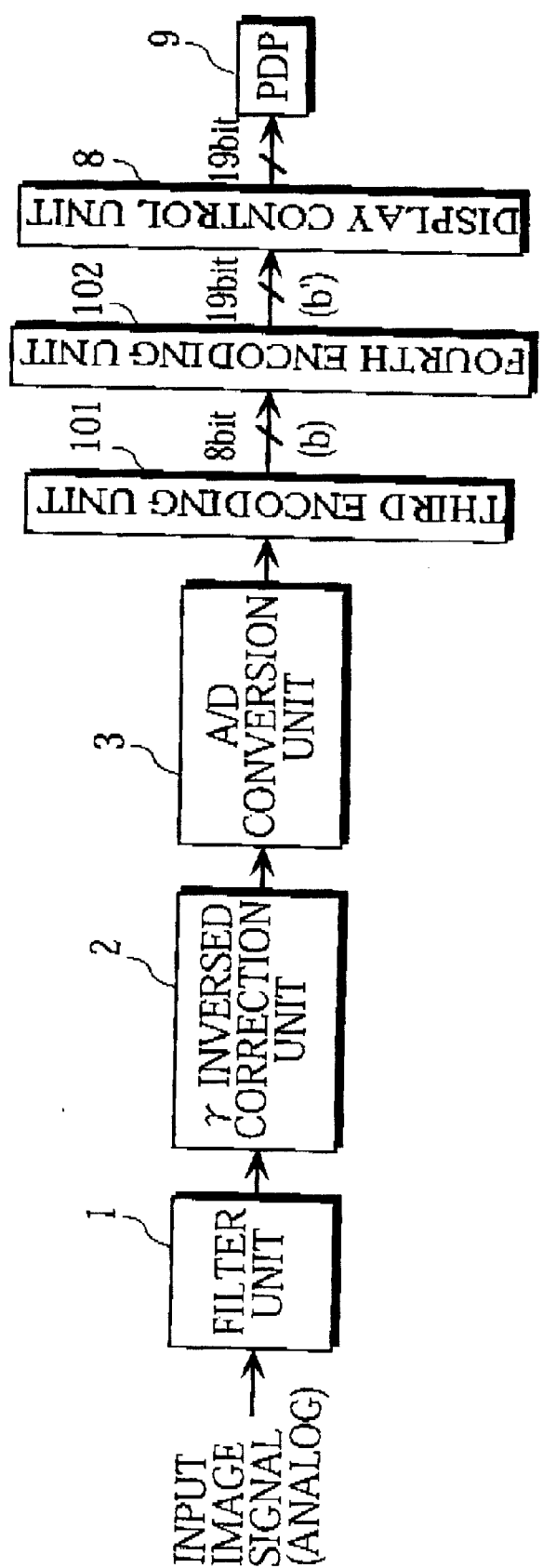
FIG. 14 is a block diagram showing the construction of the image display apparatus of Embodiment 2.

FIG. 14 is a block diagram showing the construction of the image display apparatus of Embodiment 2. The image display apparatus of Embodiment 2 includes a filter unit 1, a γ inverted correction unit 2, an A/D conversion unit 3, a display control unit 8, and a PDP 9, which are the same as Embodiment 1, and also includes a third encoding unit 101 and a fourth encoding unit 102. The components used in Embodiment 1 have the same functions in the present embodiment.

The third encoding unit 101 only discards the lower four bits of 12-bit signals to generate 8-bit signals, and does not perform the process based on the motion amount as performed by the first encoding unit of Embodiment 1.

The fourth encoding unit 102 converts the 8-bit signals output from the third encoding unit 101 into field information each piece of which is divided into 19 pieces of 1-bit subfield information, each of which indicates ON/OFF of the corresponding pixel during one TV field. The 19 pieces of subfield information respectively correspond to 19 subfields, SF1–SF19. As shown in FIG. 15, these subfields are assigned luminance weights of 16, 16, 16, 16, 16, 16, 16, 16, 16, 16, 16, 16, 16, 16, 16, 8, 4, 2, and 1 in order of time. The subfields are divided into a first subfield group including 15 subfields with luminance weight 16 and a second subfield group including the four succeeding subfields. The total luminance weight value of the second subfield group ("15" in the present embodiment) is set so that it does not exceed the maximum luminance weight of the first subfield group ("16" in the present embodiment). Also, the luminance weights of the second subfield group are set so that they, by combination, cover the luminance weights not included in the first subfield group ("1"–"15" in the present embodiment). With this arrangement, all the input signal values (gray scale levels) are expressed by combining the luminance weights assigned to the subfields of the first and second subfield groups.

Each signal level is converted by the fourth encoding unit 102 into a piece of 19-bit field information which has a illumination pattern indicated by the ● signs shown in FIG. 15. The display control unit 8 displays images on the PDP 9 using the 19-bit field information. Note that in reality, the combination patterns of S16 to S19 are used to express input signal levels 16 to 255, as well as the combination patterns of S1 to S15. However, these patterns are omitted in FIG. 15 for the sake of conveniences.

Figure 16:
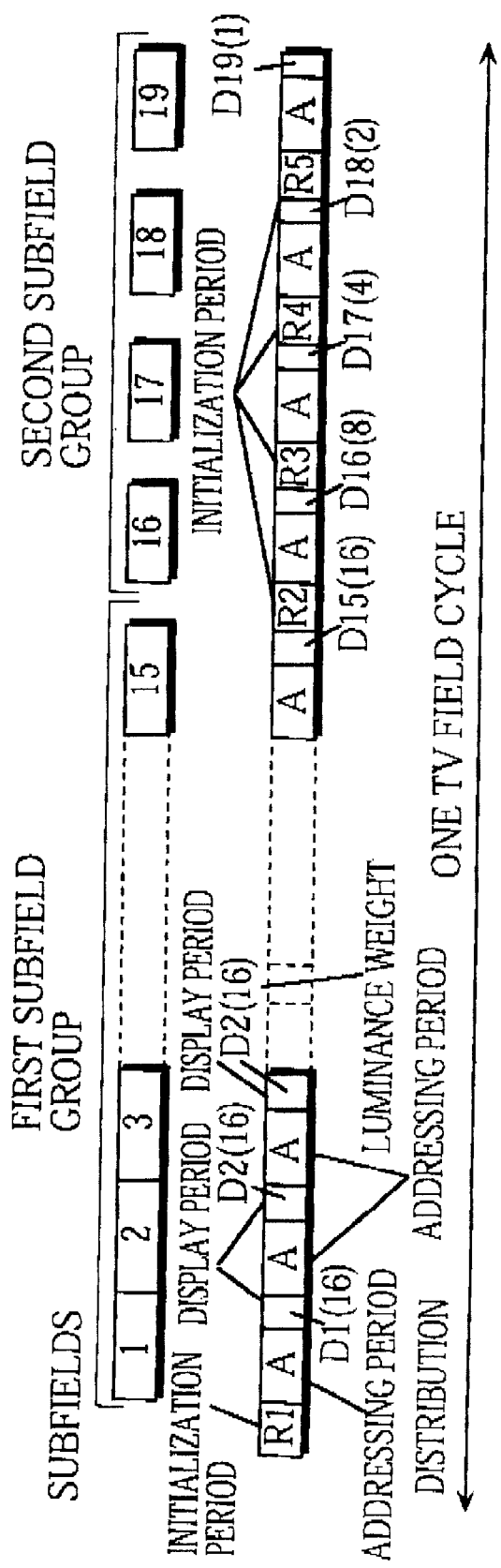
FIG. 16 shows the illumination method of the PDP of the image display apparatus.

FIG. 16 is a schematic representation of an illumination method used for the PDP 9 of the present image display apparatus. In Embodiment 2, the method of Embodiment 1 is also used in which one screen is divided into an upper part and a lower part and the addressing is simultaneously carried out for the two parts. As shown in FIG. 16, each TV field includes initialization periods R1 to R5 in which the electric charge of the panel is initialized. This initialization corresponds to an erasure of a whole screen. In the succeeding addressing periods (represented as A in the drawing), voltage is selectively applied to the pixels to be illuminated. This forms what is called wall charge for each pixel to be illuminated. Illuminations occur actually in display periods (D1 to D19 in the drawing). Note that the numerals in parentheses following the descriptions of D1 to D19 in the drawing indicate the luminance weights mentioned earlier (This applies to all the instances that appear later).

In the present example, initialization is performed only five times (in R1 to R5). More specifically, the first subfield group of SF1 to SF15 has only one initialization period R1 in front of the address period for SF1. No initialization periods are provided in front of SF2 to SF15. Accordingly, each pixel continues to illuminate from the start, holding the wall charge, until immediately before the initialization period R2 that follows SF15. As for the second subfield group composed of four subfields with small luminance weights, the start and stop of the illumination of each subfield are independently controlled, with initialization periods R2 to R5 formed ahead of the respective addressing periods, as in conventional driving methods.

With such encoding and driving methods, as the input signal level increases, the illumination start position is close to the first subfield, and the illumination period extends towards the first subfield. That is to say, the correlation between the largeness of the input signal level and the illumination pattern is secured (refer to an arrow Y1 in FIG. 15). This suppresses the occurrence of the moving image false edge, as described earlier.

It should be noted here that though the distribution of ON/OFF subfields is irregular in SF16 to SF19, the luminance weights assigned to these subfields are small enough to be neglected as an effect on the occurrence of the moving image false edge.

Also, according to the present embodiment, a small number of five initialization periods are provided on one TV field which includes 19 subfields in total. This greatly reduces the time taken for the initialization process which is necessary to control the illumination of each pixel. Accordingly, it is possible for the present image display apparatus to include more subfields in total than conventional techniques.

In case of a PDP having 480 lines which are divided into two parts to be driven simultaneously, the total display period for one TV field is expressed as follows:

(1/60)×1000,000 $\mu$s−(300 $u$ s×5+2 $\mu$s×240×19)=6,000 $\mu$s, where one initialization period is assumed to have 300 $\mu$s, and the addressing period for one line is assumed to have 2 $\mu$s. On the assumption that each illumination pulse has a cycle of 5 $\mu$s, 6000 $\mu$s/5$\mu$s=1,200 cycles in the display period for one TV field. The value indicates that enough luminance are secured for illumination.

<Embodiment 3>

The image display apparatus of Embodiment 3 with a multi-gray-scale display feature has the same construction as Embodiment 2, but uses a different driving method. The difference is described below.

Figure 17:
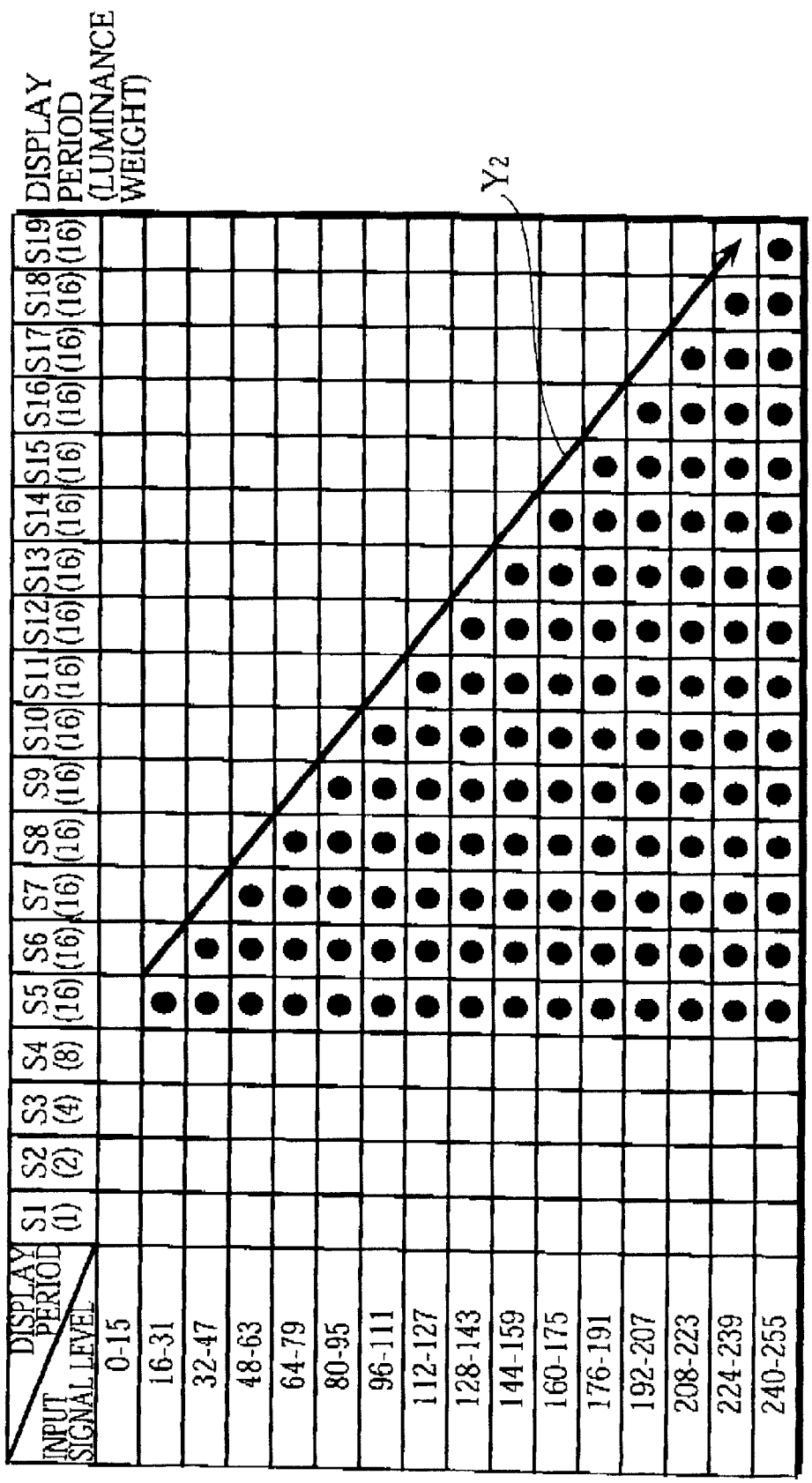
FIG. 17 shows a table used by the fourth encoding unit of the image display apparatus of another embodiment.

The fourth encoding unit 102, as in Embodiment 2, converts the 8-bit signals output from the third encoding unit 101 into field information each piece of which is divided into 19 pieces of subfield information corresponding to subfields SF1–SF19. In the present embodiment, however as shown in FIG. 17, the subfields are assigned luminance weights of 1, 2, 4, 8, 16, 16, 16, 16, 16, 16, 16, 16, 16, 16, 16, 16, 16, in order of time, in a different manner from Embodiment 2. The subfields are divided into a first subfield group including 15 subfields with luminance weight 16 and a second subfield group including the four preceding subfields. That is, the positions of the first and second subfield groups are changed, compared with Embodiment 2. Each signal level is converted by the fourth encoding unit 102 into a piece of 19-bit field information which has a illumination pattern indicated by the ● signs shown in FIG. 17. The combination patterns of S16 to S19 are omitted also in FIG. 17 for the sake of conveniences.

Figure 18:
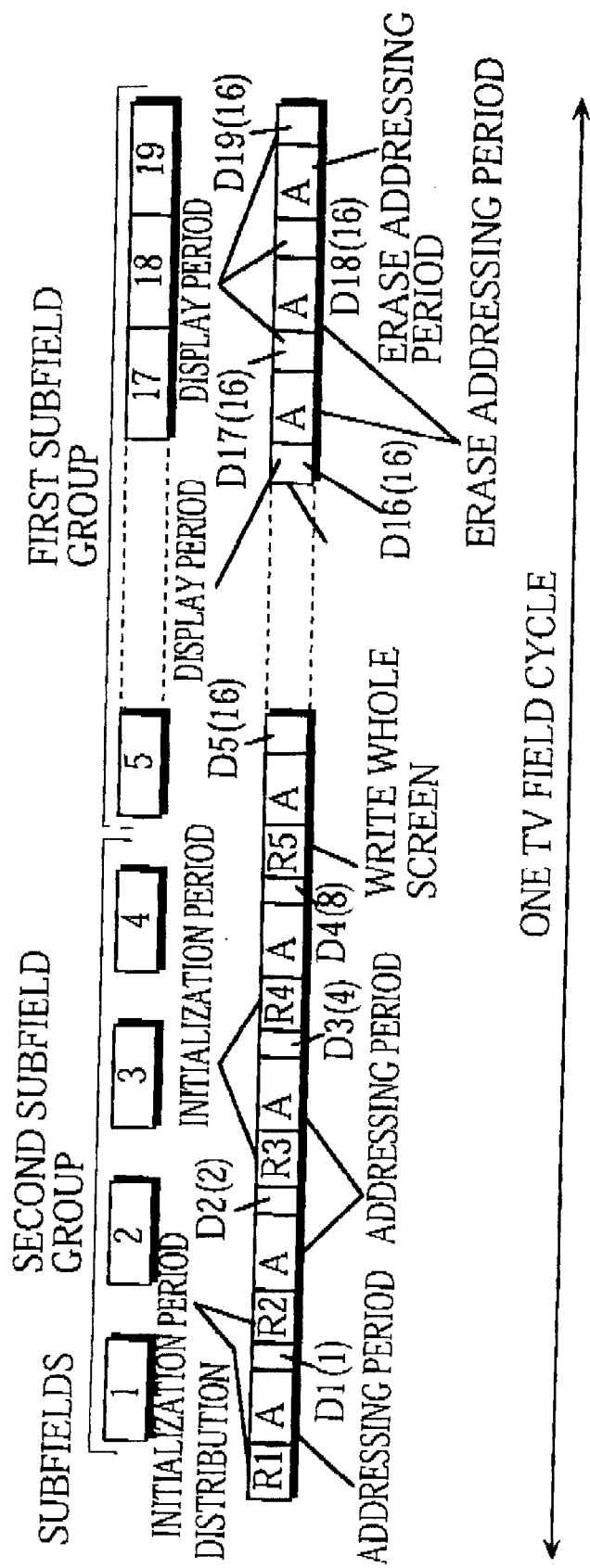
FIG. 18 shows the illumination method of the PDP of the image display apparatus.

FIG. 18 is a schematic representation of an illumination method used for the PDP 9 of the present image display apparatus. As shown in the drawing, each TV field includes initialization periods R1 to R5 in which the electric charge of the panel is initialized. In the initialization periods R1 to R4, the whole screen is erased. In the initialization period R5, the whole screen is written. In the addressing periods A of the second subfield group, voltage is selectively applied to the pixels to be illuminated. This forms, as in Embodiment 2, what is called wall charge for each pixel to be illuminated. In the addressing periods A of the first subfield group, voltage is selectively applied to the pixels to be erased so that information for erasure is written in the pixels not to be illuminated. Generally, address pulses are applied to the pixels to be illuminated to form electric charges. However, in this case, pulses are applied to all the pixels assuming that all the pixels are to be illuminated, then pixels not to be illuminated are selectively discharged. Japanese Laid-Open Patent Application No. 6-186929 explains the addressing method in detail.

With the above addressing method, a total of five initialization periods are provided (R1–R4 for erasing whole screen, and R1 for writing whole screen). This greatly reduces the time taken for the initialization process, and achives an encoding as described in Embodiment 2. That is, as the input signal level increases, the illumination subfields extends backwards over time (refer to an arrow Y2 in FIG. 17). When this happens, the illumination pattern is secured and the occurrence of the moving image false edge is suppressed.

<Embodiment 4>

Embodiment 4 introduces an image evaluation apparatus. The image evaluation apparatus evaluates images displayed on image display apparatuses, such as PDPs, which are based on pulse illuminations based on a subfield driving method. The image evaluation apparatus is achieved by a commercial personal computer (not illustrated) with a general hardware structure including a CPU, a memory (ROM, RAM, etc.), a keyboard, a hard disc, and a display. However, the present image evaluation apparatus is different from a general computer system in that it stores an image evaluation program in the hard disc so that the CPU runs the program.

Figure 19:
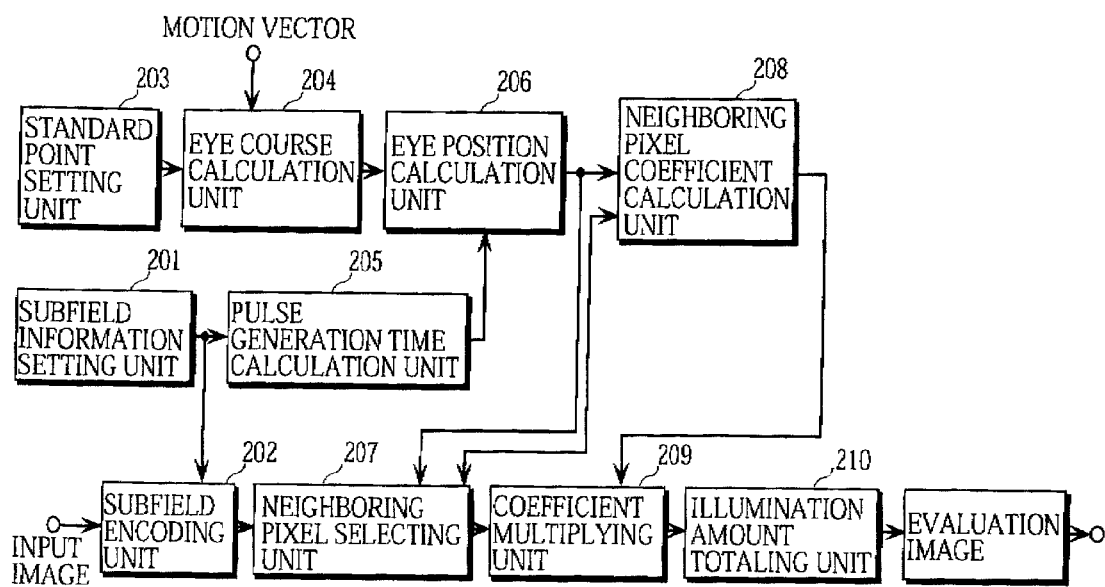
FIG. 19 is a function block diagram showing the function of the image evaluation apparatus of another embodiment.

FIG. 19 is a function block diagram showing the function of the image evaluation apparatus of the present embodiment.

As shown in the drawing, the image evaluation apparatus is composed of a subfield information setting unit 201, a subfield encoding unit 202, a standard point setting unit 203, an eye course calculating unit 204, a pulse generation time calculating unit 205, an eye position calculating unit 206, a neighboring pixel selecting unit 207, a neighboring pixel coefficient calculating unit 208, a coefficient multiplying unit 209, and an illumination amount totaling unit 210.

Figure 20:
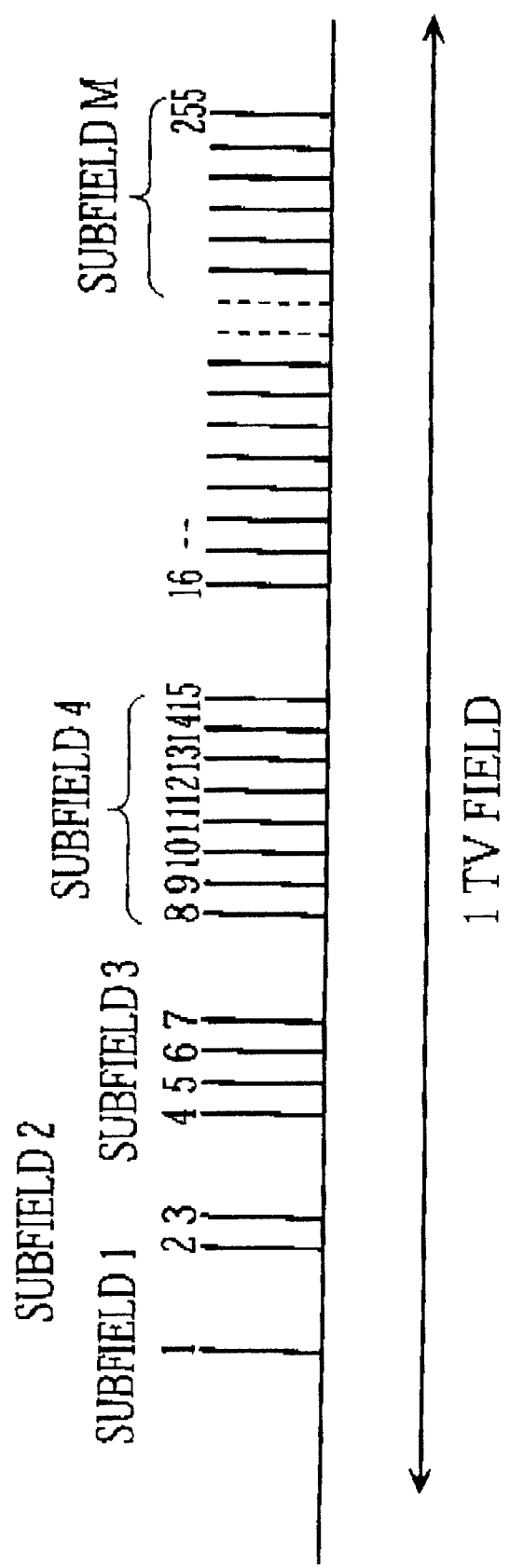
FIG. 20 shows an illumination pattern in a simulation by the image display apparatus.

The subfield information setting unit 201 sets information for dividing each TV field into a plurality of subfields. For the sake of general explanation, it is supposed here that the subfield information setting unit 201 sets information so that the pulse illumination is performed in each subfield in accordance with the luminance weight assigned and that it is performed N times in total during one TV field. For example, as shown in FIG. 20, the pulse illumination is performed once during the first subfield, twice during the second subfield, four times during the third subfield, eight times during the fourth subfield, and 255 times in total during one TV field.

The subfield encoding unit 202 converts input image signals into subfield signals based on the subfield information set by the subfield information setting unit 201. In doing so, the subfield encoding unit 202 refers to a table corresponding to the table shown in FIGS. 3(a), 4(a), 5(a), and 6(a).

The standard point setting unit 203 sets one pixel on a virtual screen as a standard point, the virtual screen being displayed with data output from the subfield encoding unit 202.

The eye course calculating unit 204 calculates, based on motion vectors, an "eye course" which is formed as a human eye follows an image in a predetermined area of the screen. The motion vector introduced in the present embodiment is a vector showing a motion amount and a direction of a certain image per unit time.

Figure 21:
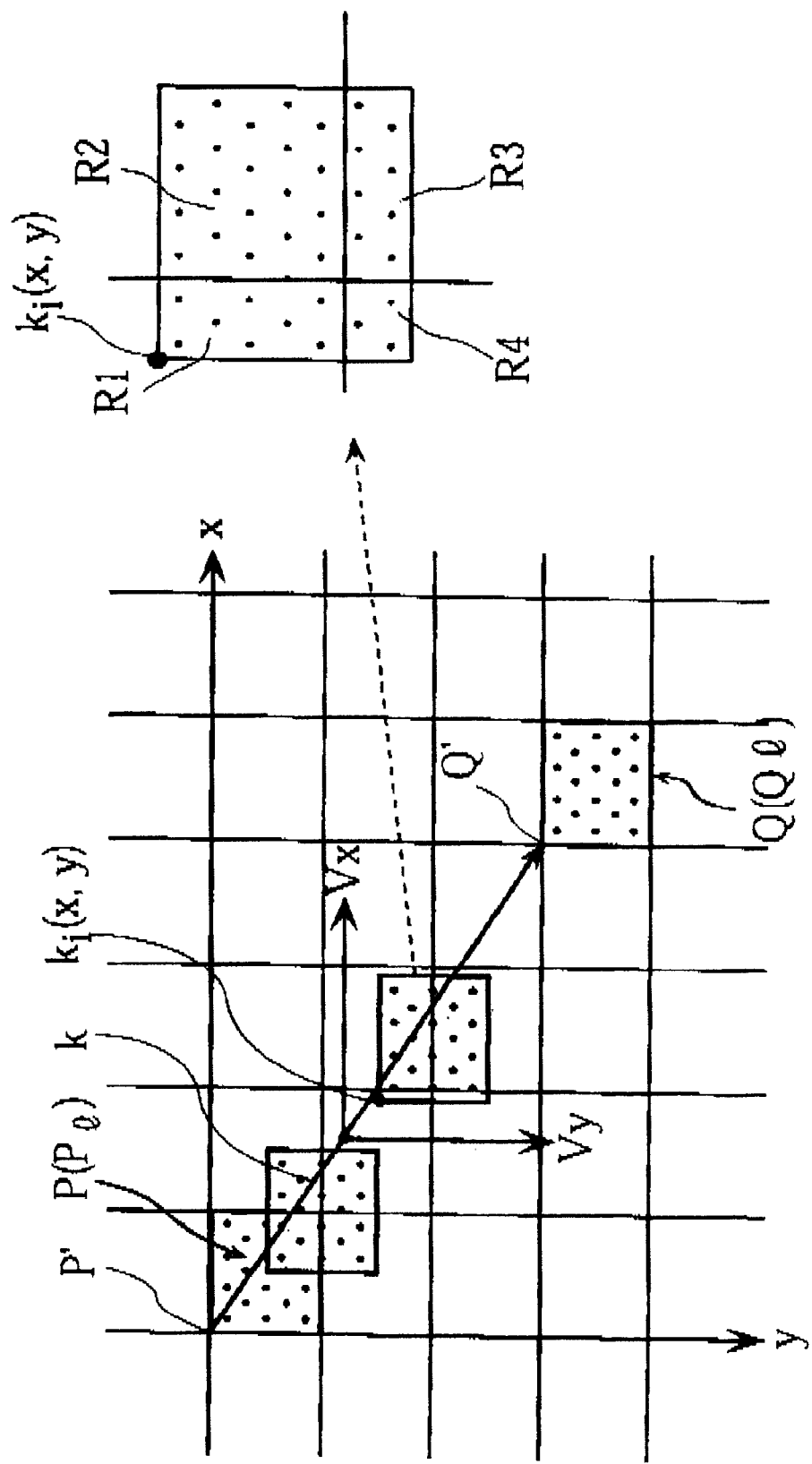
FIG. 21 is a schematic representation of the image evaluation method used by the image evaluation apparatus.

FIG. 21 is a schematic representation of the image evaluation method used by the present image evaluation apparatus. In the drawing, each quadrangle represents a pixel on the screen.

The eye course calculating unit 204 creates an X-Y coordinate system, where the origin of the coordinate system is set as a predetermined position (the upper-left corner, in this example) in the standard-point pixel set by the standard point setting unit 203. The eye course calculating unit 204 calculates the eye course based on motion vectors (Vx,Vy) represented in the X-Y coordinate system. FIG. 21 shows a movement of pixel P to the position of pixel Q by four pixels to the right and three pixels downward during one TV field. Note that here the calculation of the eye course is based on an assumption that there is strong correlation between a movement of an image on the screen and the movement of a human eye following the image.

The pulse generation time calculating unit 205 calculates the time when each illumination pulse is generated. The pulse generation time calculating unit 205 calculates this based on the order of the subfields set by the subfield information setting unit 201 and the luminance weights assigned to the subfields.

The pulse generation time calculating unit 205 also uses known time periods, such as a period required for the initialization, a period required for the addressing, and a period between the current pulse illumination and the next one to calculate each time of illumination pulse generation. Note that a clocking is performed by using the initialization start time as a standard time, and that the time for one pulse illumination is close to one point.

The eye position calculating unit 206 calculates a position on the screen marked by human eye at a time when an illumination pulse is generated, or applied to a pixel. The eye position calculating unit 206 calculates this based on the illumination pulse generation time and the calculated skipped. More specifically, the eye position calculating unit 206 calculates the "eye position" using the illumination pulse generation time calculated by the pulse generation time calculating unit 205 and the motion vectors (Vx,Vy) representing motion amounts of an image per unit time.

The neighboring pixel selecting unit 207 selects pixels which neighbor an eye course based on the eye position calculated by the eye position calculating unit 206. In doing so, the neighboring pixel selecting unit 207 assumes on the eye course a quadrangle having the same area as the pixel on the screen. Then the neighboring pixel selecting unit 207 selects among the pixels included in the quadrangle pixels, to which illumination pulses are applied, as the neighboring pixels. For example, as shown in FIG. 21, pixels R1 to R4 are selected as the neighboring pixels for the position ki(x,y) that is on the eye course.

The neighboring pixel coefficient calculating unit 208 calculates operation coefficients for the neighboring pixels selected by the neighboring pixel selecting unit 207. More specifically, the operation coefficients, which are called neighboring pixel coefficients, are areas of the neighboring pixels.

The coefficient multiplying unit 209 multiplies the illumination amounts of the neighboring pixels by the neighboring pixel coefficients. In doing so, evaluation values for the position ki(x,y) are obtained by adding up the result values of the above multiplication.

By adopting such an evaluation method which takes illuminations of pixels neighboring the eye course into consideration, it is possible to obtain an evaluation image which is close to an actual image. This is because the method reflects an effect (what is called a "moving-body eyesight" effect) that the eyesight is degraded against moving images compared to the eyesight against still images.

The illumination amount totaling unit 210 adds up the values obtained by the coefficient multiplying unit 206 for each TV field. The total illumination amount for one screen for one TV field obtained by the unit 210 is output as an evaluation image.

More specifically, the illumination amount totaling unit 210 adds up the evaluation values included in an eye course from the standard point P (pixels P) to pixel Q to obtain an illumination amount for the present pixel.

An evaluation image is obtained after the above-described process is repeated for all the pixels in one screen.

Figure 22:
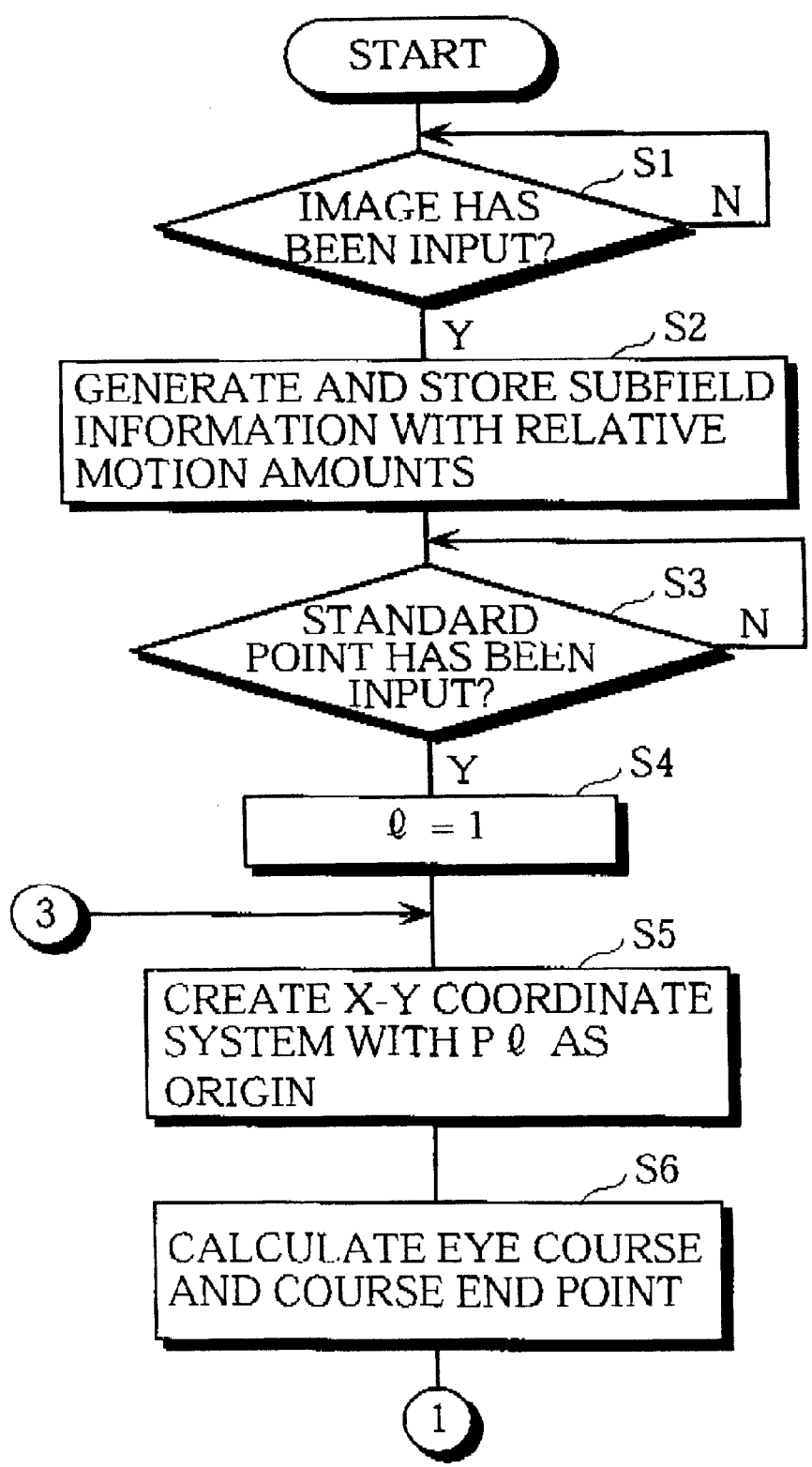
FIG. 22 is a flow chart showing a procedure of the image display apparatus.
Figure 23:
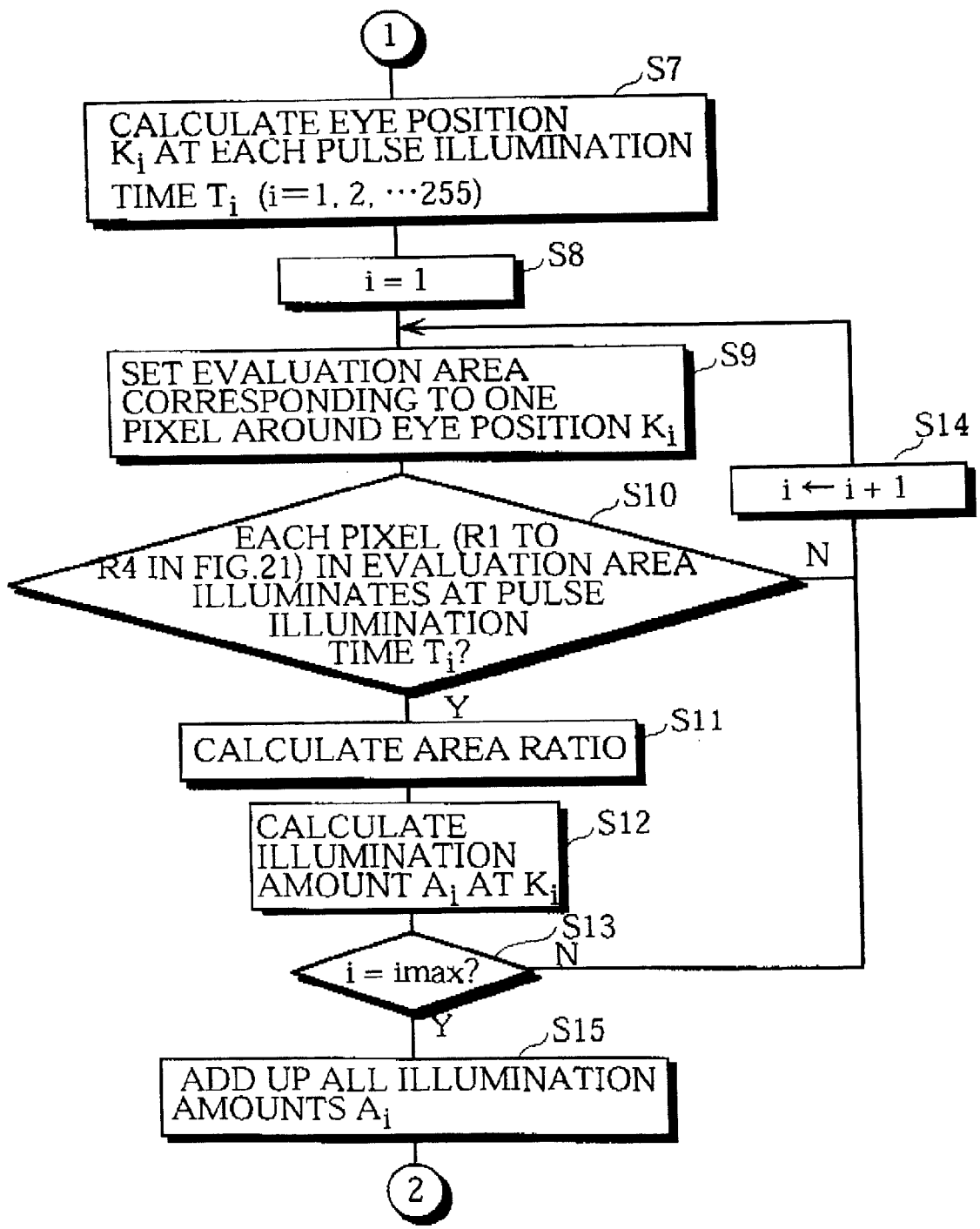
FIG. 23 is a flowchart showing a procedure of the image display apparatus.
Figure 24:
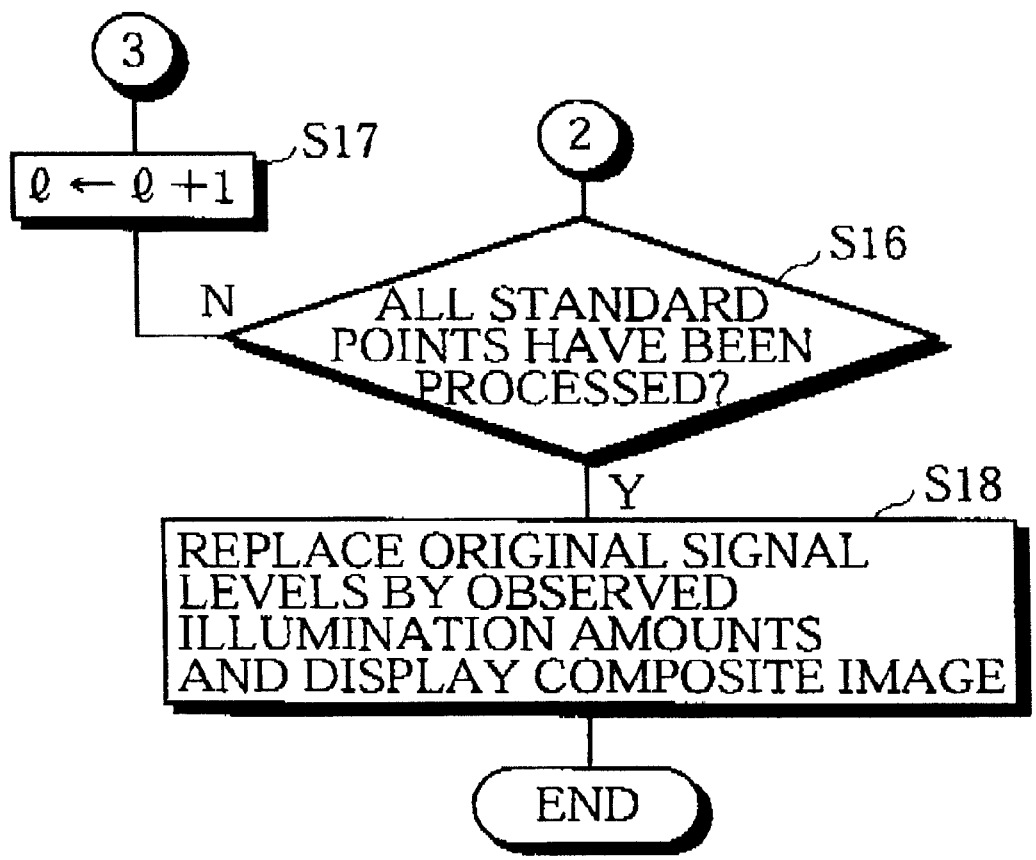
FIG. 24 is a flowchart showing a procedure of the image display apparatus.

Now, the operation of the present image evaluation apparatus is described with reference to the flowcharts shown in FIGS. 22–24.

The apparatus waits for an image input. It is judged whether an image has been input (step S1). When it is judged so, subfield information is generated and stored in a hard disc (S2). FIG. 25 shows the construction of the subfield information. As shown in the drawing, the subfield information is related to each pixel position and motion vector MV. In FIG. 25, the numerals in the parentheses of pixel positions P(1,1) to P(n,m) respectively show the pixel positions in the horizontal and vertical directions in an evaluation image which corresponds to an actual display screen. It should be noted here that the source of the subfield information, namely the table shown in FIGS. 3(a), 4(a), 5(a), and 6(a), is set by a person in charge of the evaluation (evaluator) and is stored in a memory or a hard disc.

It is judged whether a standard point P1 has been input (S3), where 1 (alphabet) indicates a standard point value ranging from "1" (numeral) to 1 max. In the present embodiment, the evaluator specifies a pixel as the standard point through a keyboard. It is needless to say that it may be programmed in advance that each pixel in a screen is selected as the standard point.

"l" (alphabet) is set to "1" (numeral) (S4). The following steps S5–S12 are repeated for each standard point. An X-Y coordinate system is created by setting the origin of the coordinate system as the upper-left corner of the standard-point pixel P1 (S5) (see FIG. 21).

The motion vector MV corresponding to the pixel P1 is read out. The eye course k and a course end point Q1 of one TV field are calculated using the motion vector MV (S6).

The eye position ki at each pulse illumination time ti (i=1, 2, . . . 255) is calculated (S7).

"i" is set to "1" (S8). An evaluation area corresponding to one pixel is set around the eye position ki (S9).

FIG. 26 shows a table stored in the hard disc which shows correspondence between the subfields SF1 to SF8 and the pulse illumination time ti.

It is judged whether each pixel (R1 to R4 in FIG. 21) in the evaluation area illuminates at the pulse illumination time ti by referring to the tables shown in FIGS. 25 and 26 (S10). More specifically, the table shown in FIG. 26 is referred to to detect a subfield SFs that corresponds to the pulse illumination time ti. Then, the table shown in FIG. 25 is referred to to determine whether each pixel in the evaluation area illuminates during the subfield Sfs. It should be noted here that the pixel position in the original image is obtained by a parallel displacement of the pixel position in the X-Y coordinate system. Also, the contents of the table shown in FIG. 26 is updated each time the evaluator sets a new source for the subfield information. This eventually updates the contents of the table shown in FIG. 25 which is made based on the table shown in FIG. 26.

When it is judged that pixels in the evaluation area illuminate at the pulse illumination time ti in step S10, a ratio of the area of an illumination pixel to the area of the evaluation area is calculated for each of the illumination pixels, assuming the area of the evaluation area is "1" (S11). An illumination amount Ai for the eye position ki is obtained by adding up each result which is obtained by multiplying an illumination amount per one pulse illumination by each area ratio (S12). It should be noted here that the use of the above-described area ratio may not reflect a whole illumination amount of one pixel if the area of the evaluation value exceeds the pixel. However, the larger the evaluation area is set, an effect of neighboring pixels in broader area should be considered. This will reduce the accuracy of the evaluation. Accordingly, it is anticipated that this method maintains the evaluation accuracy at the same level as a case in which a smaller area is set for the evaluation area than this method. This is achieved by setting small operation coefficients for the neighboring pixels to reduce the effect by the illumination of the surrounding pixels.

It is judged whether "i" is equal to "imax" (=255) (S13). When the judgement is negative, "i" is incremented by "1" (S14). In this way, the steps S9 to S12 are repeated for each of the succeeding pulse illumination times t2–t255.

When it is judged that no pixels in the evaluation area iluminate in step S10, control goes to step S14 to process for the next pulse illumination time.

All the illumination amounts Ai obtained in the steps S9 to S14 are added up to obtain an observed illumination amount for the standard point P1 (S15). It is judged whether all the standard points have been processed by judging whether "l" is equal to "lmax" (S16). When the judgement is negative, "l" is incremented by "1" (S17) and control returns to step S5. In this way, the steps S5 to S15 are repeated until the observed illumination amount is calculated for each standard point.

When it is judged that all the standard points have been processed in step S16, control proceeds to step S18. The original signal levels are replaced by the observed illumination amounts for respective pixels. The composite image generated by this is displayed on the display of the computer system (S18). The evaluator evaluates the displayed composite image.

In the above description, the subfield information for all the pixels is generated in advance in step S2. However, this process may be executed when the illumination amounts for all the eye positions are added up. That is, as the evaluation area is set in step S9, the pixels included in the evaluation area are determined. The determined pixels affect the illumination amount for the eye position. The subfield information for the determined pixels may be generated at this stage to check for the illumination subfields.

As described above, the evaluation method of the present embodiment takes illuminations of pixels neighboring the eye course into consideration by performing a certain calculation for the neighboring pixels. This provides an advantage to the present invention over a conventional method in which a calculation is performed only for one pixel on the eye course. That is, the present invention eliminates an unstableness that the evaluation image greatly changes when the original image makes only a slight movement. Also, it is possible for the present invention to set the eye course in an arbitrary direction, such as in the vertical, horizontal, or slant direction. This enables the evaluation person to evaluate images in a stable manner since the evaluation image correctly reflects the movement of the original image observed by a viewer.

Also, in terms of the image quality, the evaluation image completely matches the original image in case of still pictures when the motion vectors are "0". Accordingly, in case of still pictures, the evaluation person observes the same image as a viewer of the original image.

The present image evaluation apparatus can obtain by calculation the same image as an image obtained by recording a moving image on the screen using a pixel-based video recorder, such as a CCD camera. However, in reality, it is difficult with a CCD camera to evaluate excellently reproduced images since a repetitive, high-speed scanning is required. In contrast, the present image evaluation apparatus provides highly reliable image evaluation by simulations with excellently reproduced images.

<Others>

(1) In Embodiment 1, 10 levels of motion amounts are detected. However, the process may be varied as follows. In the first stage, it is judged whether an input image is a moving image or a still image; and in the second stage, one signal level selected among limited signal levels is output in case of a moving image, and the input signal is output as it is in case of a still image. Also, it is possible to detect the motion amount in three levels: radical, middle, and none, and encodes input signals in accordance with the motion amount levels.

Also, in the above embodiment, the 10 subfields are assigned luminance weights 1, 2, 4, 7, 13, 23, 33, 43, 55, and 74, respectively. However, the luminance weights may be set as 1, 2, 4, 8, 16, 24, 32, 48, 56, and 64.

Alternatively, 12 subfields may used, with luminance weights 1, 2, 4, 8, 12, 16, 24, 28, 32, 36, 44, and 48. It is also possible to use 11 subfields, with luminance weights 1, 2, 4, 8, 16, 24, 32, 36, 40, 44, and 48.

It is also possible to use 9 subfields, with luminance weights 1, 2, 4, 8, 16, 32, 48, 64, and 80.

It is also possible to use 8 subfields with luminance weights 1, 2, 4, 8, 16, 32, 64, and 128 which has been introduced earlier as a conventional combination that may cause a moving image false edge. In this case, first, it is judged whether a motion amount is detected or not (motion amount "0"). When a motion amount is detected, output signal levels are limited. FIG. 28 shows an example of the signal limitation. As shown in the drawing, input signal levels grouped as shown in the left-hand column are converted to corresponding encoded signal levels shown in the right-hand column to suppress the occurrence of the moving image false edge. When a motion amount is not detected (motion amount "0"), all gray scale levels (0–255) are available. Here, it is also possible to classify the motion amount into three levels of "radical," "middle," and "none," and limit selectable signal levels in proportionate to the motion amount levels. That is, as the motion amount decreases, the number of selectable signal levels increases. In other words, as the motion amount decreases, the number of selectable signal levels is given a higher priority. For example, the limitations as shown in FIGS. 27, 28, and 29 may be used respectively for "radical," "middle," and "none" motion amounts.

In general, as the number of subfields increases, the change of luminance weights is reduced and the change of illumination/non-illumination for the subfields is also reduced. As a result, it may be said that the effect of suppressing the occurrence of the moving image false edge is remarkable when one TV field includes a lot of subfields.

It should be noted here that the luminance weights may be assigned to the subfields in descending order, as shown in FIGS. 30, 31, 32, and 33 which correspond to FIGS. 3(*a*), 4(*a*), 5(*a*), and 6(*a*).

Figure 34:
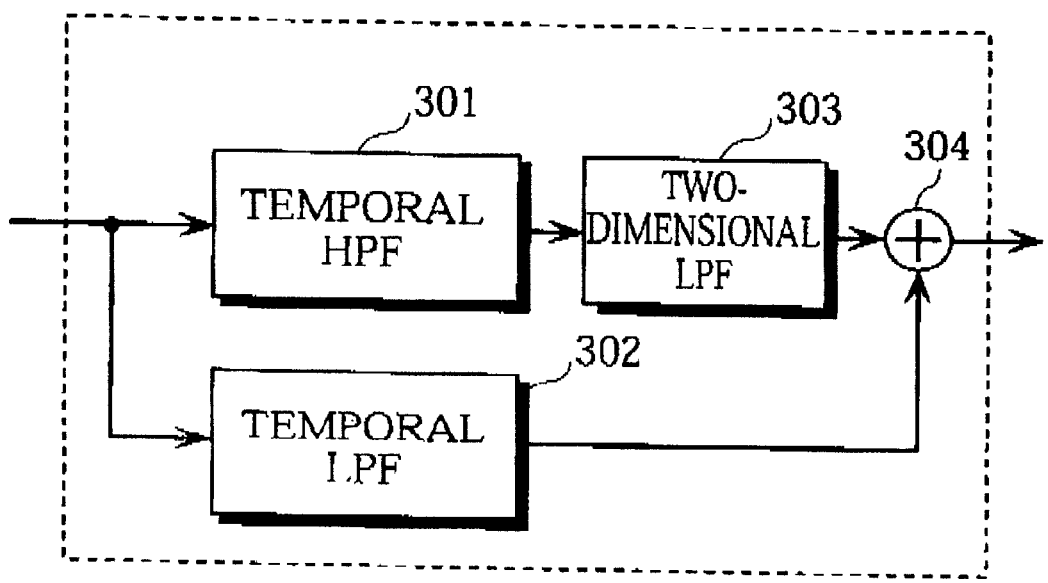
FIG. 34 is a block diagram showing the construction of a variation of the filter unit of Embodiment 1.
Figure 35:
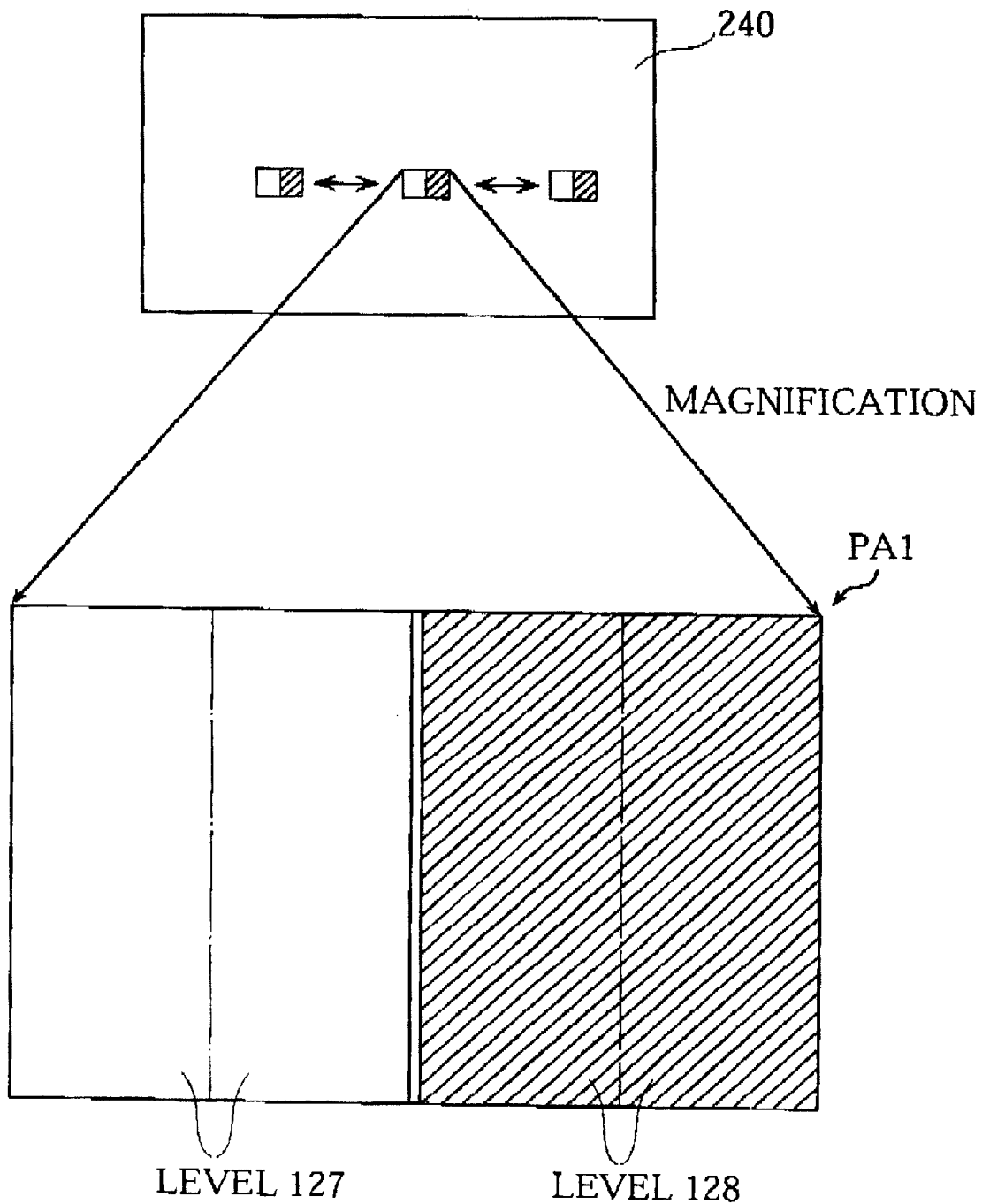
FIG. 35 shows a horizontal movement of an image pattern of two pixels in a conventional image display apparatus.
Figure 36:
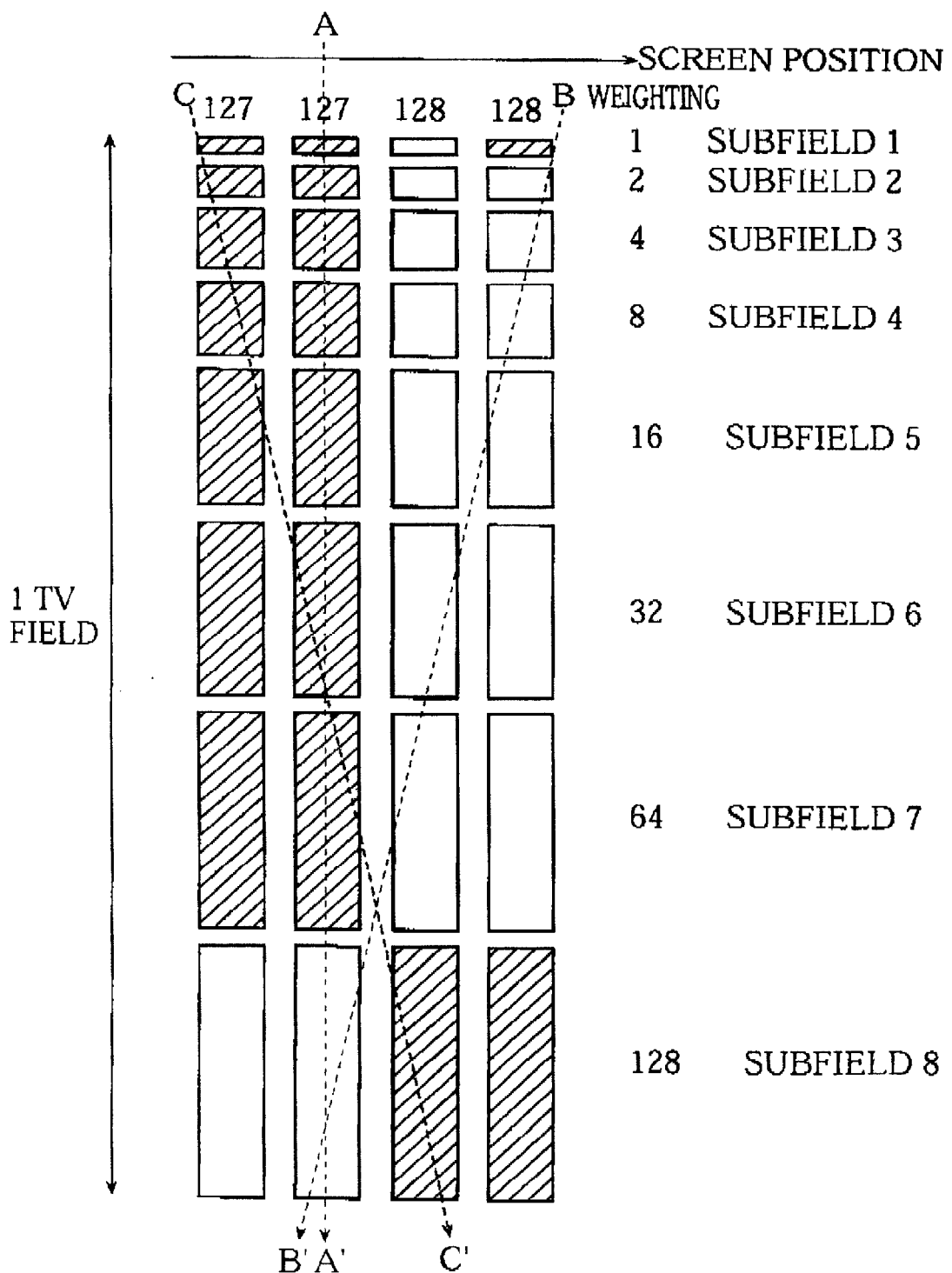
FIG. 36 is a schematic representation of the movement of the image pattern shown in FIG. 35 followed by a human eye.
Figure 37:
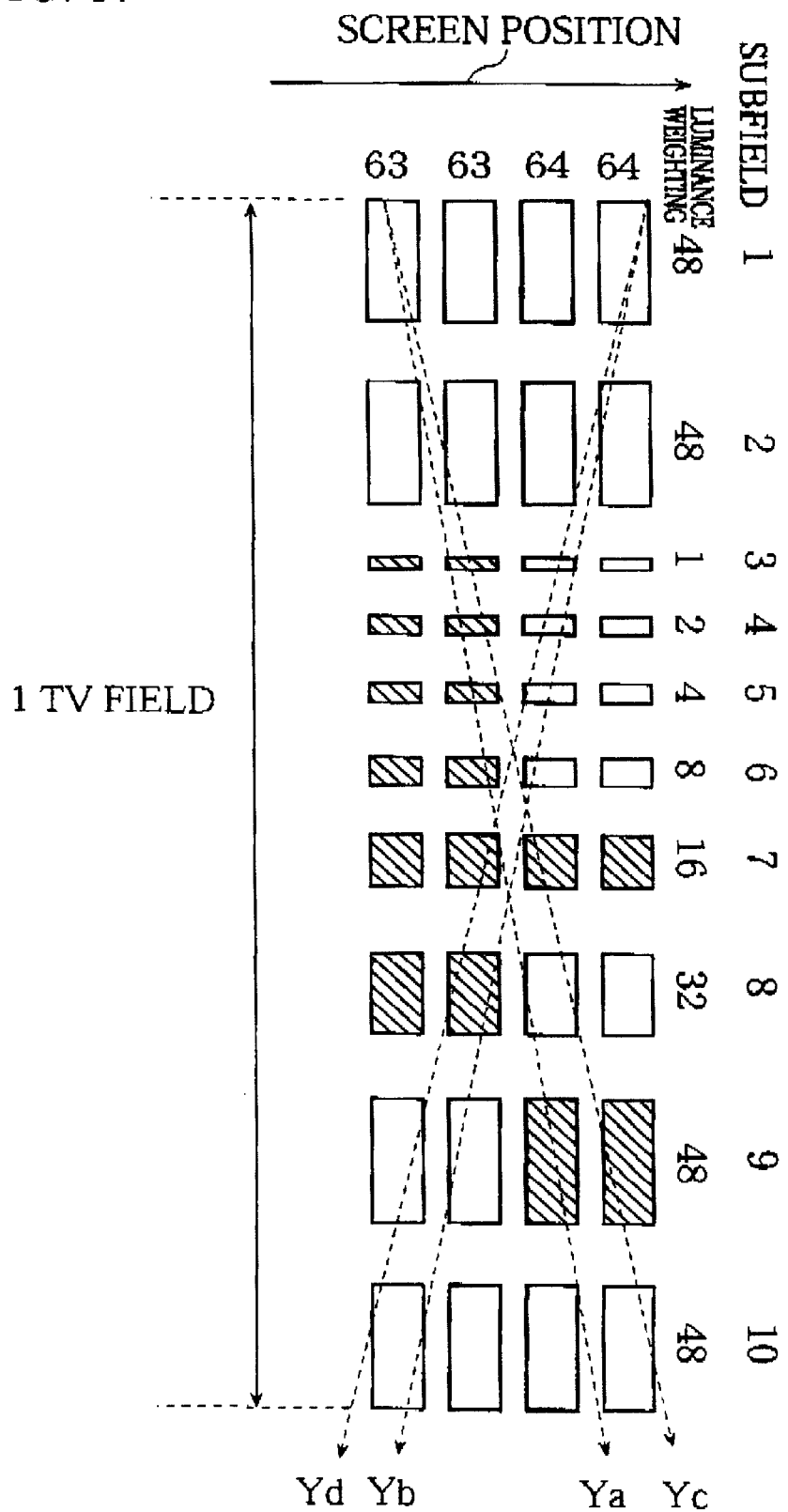
FIG. 37 corresponds to FIG. 36 and is used to explain another conventional image display apparatus.

(2) The filter unit 1 of Embodiment 1 may have a construction as shown in FIG. 34. As shown in the drawing, the filter unit 1 is composed of a temporal HPF 301 being a time response high pass filter, a temporal LPF 302 being a time response low pass filter, a two-dimensional low pass filter 303, and an addition unit 304.

With such a construction, the temporal HPF 301 outputs only components with radical changes in a time series out of the components of input image signals. The two-dimensional low pass filter 303 suppresses high spatial frequency components of the components output from the temporal HPF 301. The addition unit 304 combines the outputs of the two-dimensional low pass filter 303 and the temporal LPF 302. As a result, an image is finally displayed by suppressing the components that radically change in a time series and have minute patterns.

Accordingly, the present construction of the filter unit 1 also generates the same effect as Embodiment 1. That is, components with minute patterns to change in short periods are not displayed. This prevents noises from being displayed. Also, by adopting the present construction, high spatial frequency components are maintained. When this happens, moving images are displayed without degradation of response characteristics and are displayed without degradation of image quality where minute components of the images are not displayed or the like.

(3) In Embodiment 1, the motion amount is detected by calculating the differences between signal levels of two different frames for each pixel, and using the differences as variation values. However, the motion amount may be obtained by other methods. For example, the motion amount may be obtained by calculating a mean variation value for each image block which includes a plurality of pixels. Alternatively, the motion amount may be obtained with a method called pattern matching in which the signal levels are matched to those of a template.

(4) The distribution pattern of the luminance weights to the 10 subfields shown in Embodiments 2 and 3 may be varied in many ways. For example, the luminance weights may be assigned as 23, 22, 21, 20, 19, 18, 17, 16, 15, 14, 13, 12, 11, 10, 6, 4, 2, and 1. Furthermore, the subfields with these luminance weights may be divided into a first subfield group and a second subfield group, where the first subfield group is an initial part of the TV field composed of successive 14 subfields (having luminance weights 23, 22, 21, 20, 19, 18, 17, 16, 15, 14, 13, 12, 11, 11), and the second subfield group being composed of the rest of the subfields. Alternatively, one TV field may include a total of 15 subfields, and the luminance weights may be assigned as 24, 24, 24, 24, 24, 24, 24, 24, 24, 24, 16, 10, 6, 4, 2, and 1. The subfields with these luminance weights may be divided into a first subfield group composed of successive first 10 subfields (having luminance weights 24 and 16) and a second subfield group composed of the rest of the subfields.

For the present cases, as described in the embodiments, it is also possible to set the total luminance weight value of the second subfield group not to exceed the maximum luminance weight of the first subfield group and so that the luminance weights of the second subfield group, by combination, cover the luminance weights not included in the first subfield group.

Also, by performing the initialization a certain times less than the number of subfields for each TV field, an effect of suppressing the occurrence of the moving image false edge is generated since the display period increases by this.

Also, the number of subfields in the second subfield group may be increased and the number of initializations may be reduced so that the image quality for low luminance is improved.

(5) In Embodiments 1, 2, and 3, each input analog image is subjected to the γ inversed correction process, and after this process, each signal is subjected to the A/D conversion process. However, the order of these performances may be reversed.

(6) Use of the image evaluation apparatus shown in Embodiment 4 provides an excellent guidance to the design of image display apparatuses represented by PDP, helping the designer determine the number of subfields and the luminance weights. Image display apparatuses designed in this way display images with reduced occurrences of moving image false edges.

Furthermore, the image evaluation feature of the present image evaluation apparatus may be achieved by a program. Such a program may be recorded in floppy disks, IC cards, ROM cassettes and the like and may be carried or transported to be run on an independent computer system.

(7) The techniques disclosed in Embodiments 1 to 4 of the present description may be applied to DMD (Digital Micromirror Device) in a similar manner.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image display apparatus which displays a multi-gray-scale image, where the multi-gray-scale image is displayed in a time unit called TV field which is divided into N subfields which are respectively assigned luminance weights, and the multi-gray-scale image is expressed by illuminating desired subfields, the image display apparatus comprising:

a first selecting unit for selecting a group of gray scale levels which cause the number of selectable gray scale levels to increase as a motion amount of an input image signal decreases, among the plurality of gray scale levels, wherein the luminance weights are represented as W1, W2, . . . and WN, each of the plurality of gray scale levels is expressed by an arbitrary combination of 0, W1, W2, . . . and WN, and the motion amount is a change of the input image signal over time, the first selecting unit including a table showing correspondence between motion amounts and combinations of gray scale levels in order between which a predetermined number of gray scale levels are skipped, wherein the table, as the motion amount increases, the predetermined number of skipped gray scale levels increases;

a second selecting unit for selecting a gray scale level in accordance with a gray scale level of the input image signal, among the group of gray scale levels selected by the first selecting unit including a detecting unit for detecting a combination of gray scale levels from the table in accordance with the motion amount of the input image signals, and a subfield illuminating unit for illuminating subfields corresponding to the gray scale level selected by the second selecting unit, the subfield illuminating unit illuminates subfields corresponding to a gray scale level which corresponds to the input image signal, among the combination of gray scale levels detected by the detecting unit.

2. The image display apparatus of claim 1, where in the table, for a range of middle to lower motion amounts, input signal levels are proportionate to the total luminance weight of subfields to be illuminated, and for a range of middle to higher motion amounts, as the input signal level increases, in a combination of subfields to be illuminated corresponding to the input signal level, each subfield that changes from an illumination state to a non-illumination state has a smaller luminance weight.

3. An image display apparatus which displays a multi-gray-scale image, where the multi-gray-scale image is displayed in a time unit called a TV field which is divided into a plurality of subfields which are respectively assigned luminance weights, and the multi-gray-scale image is expressed by illuminating desired subfields, the image display apparatus comprising:

a converting means for converting an input image signal into subfield information for each pixel, the subfield information showing a state of each subfield, the state being either of ON and OFF which respectively correspond to illumination and on-illumination;

a display having a display screen which is composed of a plurality of pixels being illumination cells; and a display control means which controls illumination of the illumination cells by sequentially reading the subfield information in units of TV fields and by illuminating the illumination cells in accordance with the read subfield information, and prior to the illumination of the illumination cells, initializes the plurality of pixels and performs an addressing of pixels to be illuminated, wherein the display control means initializes the plurality of pixels before one or more predetermined subfields and performs the initialization a number of times which is less than the total number of subfields within the TV field, wherein the converting means stores information showing correspondence between each possible level of the input image signal and a piece of subfield information, where in the information stored in the converting means, input signals levels in a predetermined range correspond to pieces of subfield information which show illumination subfields extend either of forward and backward over time, wherein a total number of subfields in one TV field is N, and each TV field includes:

a first subfield group being composed of successive M subfields to which one of same relatively large luminance weights and slightly and gradually changing relatively large luminance weights are assigned; and a second subfield group being composed of other (N-M) subfields, wherein the display control means initializes the plurality of pixels before each subfield in the first subfield group and performs the initialization (M−1) times or less for each TV field.

4. The image display apparatus of claim 3, where the first subfield group is arranged at an initial part of each TV field and the second subfield group follows the first subfield group, and the display control means initializes the plurality of pixels once before a first subfield of the first subfield group and in this initialization, electric charges stored in each illumination cell are removed and then an addressing is performed in which electric charges are formed in illumination cells to be illuminated.

5. The image display apparatus of claim 4, wherein the display control means includes:

a first addressing unit for performing an addressing to a part of the plurality of pixels of the display screen; and a second addressing unit for performing an addressing to the rest of the plurality of pixels in parallel to the addressing performed by the first addressing unit.

6. The image display apparatus of claim 5, wherein 256 gray scale levels are used in total, and one of the following conditions (1) and (2) is satisfied:

(1) each TV field is divided into 19 subfields, and luminance weights assigned to the 19 subfields are 23, 22, 21, 20, 19, 18, 17, 16, 15, 14, 13, 12, 11, 11, 10, 6, 4, 2, and 1 in time order; and (2) each TV field is divided into 15 subfields, and luminance weights assigned to the 15 subfields are 24, 24, 24, 24, 24, 24, 24, 24, 24, 16, 10, 6, 4, 2, and 1 in time order.

7. The image display apparatus of claim 3, wherein the first subfield group is arranged at a last part of each TV field and the second subfield group precedes the first subfield group, and the display control means initializes the plurality of pixels once before a first subfield of the first subfield group and in this initialization, electric charges are formed in illumination cells to be illuminated and then an addressing is performed in which electric charges stored in non-illumination cells are removed.

8. The image display apparatus of claim 7, wherein the display control means includes:
a first addressing unit for performing an addressing to a part of the plurality of pixels of the display screen; and
a second addressing unit for performing an addressing to the rest of the plurality of pixels in parallel to the addressing performed by the first addressing unit.

9. The image display apparatus of claim 8, wherein 256) gray scale levels are used in total, and
one of the following conditions (1) and (2) is satisfied:
(1) each TV field is divided into 19 subfields, and luminance weights assigned to the 19 subfields are 23, 22, 21, 20, 19, 18, 17, 16, 15, 14, 13, 12, 11, 11, 10, 6, 4, 2, and 1 in time order; and
(2) each TV field is divided into 15 subfields, and luminance weights assigned to the 15 subfields are 24, 24, 24, 24, 24, 24, 24, 24, 24, 16, 10, 6, 4, 2, and 1 in time order.

10. An image display apparatus which displays a multi-gray-scale image, where the multi-gray-scale image is displayed in a time unit called a TV field which is divided into N subfields which are respectively assigned luminance weights, and the multi-gray-scale image is expressed by illuminating desired subfields, the image display apparatus comprising:
a first selecting means for selecting a group (N+1) gray scale levels which are 0, W1, W1+W2, W1+W2+W3, . . . W1+W2+W3+ . . . +WN when the motion amount is at its maximum, wherein the luminance weights are represented as W1, W2, . . . and WN, $W1 \leq W2 \leq \ldots \leq WN$, and the motion amount is a change of the input signal over time;
a second selecting means for selecting a gray scale level in accordance with a gray scale level of the input image signal, among the group of (N1+) gray scale levels selected by the first selecting means; and
a subfield illuminating means for illuminating subfields corresponding to the gray scale level selected by the second selecting means.

11. An image display apparatus which displays a multi-gray-scale image, where the multi-gray-scale image is displayed in a time unit called a TV field which is divided into N subfields which are respectively assigned luminance weights, and the multi-gray-scale image is expressed by illuminating desired subfields, the image display apparatus comprising:
a table showing correspondence between motion amounts and combinations of gray scale levels in order between which a predetermined number of gray scale levels are skipped, wherein in the table, as the motion amount increases, the predetermined number of skipped gray scale levels increases, and the motion amount is a change of the input image signal over time;
a detecting unit for detecting a combination of gray scale levels from the table in accordance with the motion amount of the input image signal;
a selecting unit for selecting a gray scale level in accordance with a gray scale level of the input image signal, among the combination of gray scale levels detected by the detecting unit; and
a subfield illuminating unit for illuminating subfields corresponding to the gray scale level selected by the selecting means, wherein
in the table, a maximum motion amount corresponds to a combination of gray scale levels which each are composed of one subfield and subfields included in a gray scale level which is smaller than a present gray scale level by one level.

12. An image display apparatus which displays a multi-gray-scale image, where the multi-gray-scale image is displayed in a time unit called a TV field which is divided into N subfields which are respectively assigned luminance weights, and the multi-gray-scale image is expressed by illuminating desired subfields, the image display apparatus comprising:
a motion amount detecting means which obtains a difference between gray scale levels for a same pixel position in a present frame and a preceding frame and detects a motion amount when the difference exceeds a predetermined value and otherwise detects motion amount "0";
a table showing correspondence between motion amounts and combinations of gray scale levels in order, wherein the luminance weights are represented as W1, W2, . . . and WN, each of the plurality of gray scale levels is expressed by an arbitrary combination of 0, W1, W2, . . . and WN, and the table shows a combination of all gray scale levels for the input image signal corresponding to the motion amount "0," wherein the combinations of gray scale levels corresponding to the motion amount is arranged in order with a predetermined number of gray scale levels being skipped;
a detecting unit for detecting a combination of gray scale levels from the table in accordance with a motion amount detected by the motion amount detecting means;
a selecting unit for selecting a gray scale level, in accordance with a gray scale level of the input image signal, among the combination of gray scale levels detected by the detecting unit; and
a subfield illuminating means for illuminating subfields corresponding to the gray scale level selected by the selecting unit, wherein
in the table, each gray scale level included in the combination of gray scale levels corresponding to the motion amount is composed of one subfield and subfields included in a gray scale level which is smaller than a present gray scale level by one level.

13. An image display apparatus which displays a multi-gray-scale image, where the multi-gray-scale image is displayed in a time unit called a TV field which is divided into N subfields which are respectively assigned luminance weights, and the multi-gray-scale image is expressed by illuminating desired subfields, the image display apparatus comprising:
a preliminary motion amount detecting unit which obtains a difference between gray scale levels for a same pixel position in a present frame and a preceding frame and detects one of a motion amount and motion amount "0" based on the difference;
a slant block detecting unit for detecting a slant block in which gray scale levels change monotonously over successive pixel positions;
a motion amount correcting unit for correcting, based on a result of the slant block detecting unit, the motion amount detected by the preliminary motion amount detecting unit;
a table showing correspondence between motion amounts and combinations of gray scale levels in order, wherein the luminance weights are represented as W1, W2, . . . and WN, each of the plurality of gray scale levels is expressed by an arbitrary combination of 0, W1, W2, . . . and WN, and the table shows a combination of all gray scale levels for the input image signal corresponding to the motion amount "0," wherein the combinations of gray scale levels corresponding to the motion amount is arranged in order with a predetermined number of gray scale levels being skipped;

a detecting unit for detecting a combination of gray scale levels from the table in accordance with a motion amount detected by the motion amount detecting means;

a selecting unit for selecting a gray scale level, in accordance with a gray scale level of the input image signal, among the combination of gray scale levels detected by the detecting unit; and a subfield illuminating means for illuminating subfields corresponding to the gray scale level selected by the selecting unit, wherein in the table, each gray scale level included in the combination of gray scale levels corresponding to the motion amount is composed of one subfield and subfields included in a gray scale level which is smaller than a present gray scale level by one level.

14. An image display apparatus which displays a multi-gray-scale image, where the multi-gray-scale image is displayed in a time unit called a TV field which is divided into N subfields which are respectively assigned luminance weights, and the multi-gray-scale image is expressed by illuminating desired subfields, the image display apparatus comprising:

a motion amount detecting means which obtains a difference between gray scale levels for a same pixel position in a present frame and a preceding frame and detects a motion amount when the difference exceeds a predetermined value and further detects, in accordance with the difference, one out of two or more graded motion amounts, and otherwise detects motion amount "0";

a table showing correspondence between motion amounts and combinations of gray scale levels in order, wherein the luminance weights are represented as W1, W2, . . . and WN, each of the plurality of gray scale levels is expressed by an arbitrary combination of 0, W1, W2, . . . and WN, and the table shows a combination of all gray scale levels for the input image signal corresponding to the motion amount "0," wherein the combinations of gray scale levels corresponding to the motion amount is arranged in order with a predetermined number of gray scale levels being skipped;

a detecting unit for detecting a combination of gray scale levels from the table in accordance with a motion amount detected by the motion amount detecting means;

a selecting unit for selecting a gray scale level, in accordance with a gray scale level of the input image signal, among the combination of gray scale levels detected by the detecting unit; and a subfield illuminating means for illuminating subfields corresponding to the gray scale level selected by the selecting unit, wherein in the table, a maximum motion amount corresponds to a combination of gray scale levels which each are composed of one subfield and subfields included in a gray scale level which is maller than a present gray scale level by one level.

15. An image display apparatus which displays a multi-gray-scale image, where the multi-gray-scale image is displayed in a time unit called a TV field which is divided into N subfields which are respectively assigned luminance weights, and the multi-gray-scale image is expressed by illuminating desired subfields, the image display apparatus comprising:

a preliminary motion amount detecting unit which obtains a difference between gray scale levels for a same pixel position in a present frame and a preceding frame and detects, in accordance with the difference, a motion amount out of two or more graded motion amounts;

a slant block detecting unit for detecting a slant block in which gray scale levels change monotonously over successive pixel positions; and a motion amount correcting unit for correcting, based on a result of the slant block detecting unit, the motion amount detected by the preliminary motion amount detecting unit;

a table showing correspondence between motion amounts and combinations of gray scale levels in order, wherein the luminance weights are represented as W1, W2, . . . and WN, each of the plurality of gray scale levels is expressed by an arbitrary combination of 0, W1, W2, . . . and WN, and the table shows a combination of all gray scale levels for the input image signal corresponding to the motion amount "0," wherein the combinations of gray scale levels corresponding to the motion amount is arranged in order with a predetermined number of gray scale levels being skipped;

a detecting unit for detecting a combination of gray scale levels from the table in accordance with a motion amount detected by the motion amount detecting means;

a selecting unit for selecting a gray scale level, in accordance with a gray scale level of the input image signal, among the combination of gray scale levels detected by the detecting unit; and a subfield illuminating means for illuminating subfields corresponding to the gray scale level selected by the selecting unit, wherein in the table, a maximum motion amount corresponds to a combination of gray scale levels which each are composed of one subfield and subfields included in a gray scale level which is smaller than a present gray scale level by one level.

16. An image display apparatus which displays a multi-gray-scale image, where the multi-gray-scale image is displayed in a time unit called a TV field which is divided into N subfields which are respectively assigned luminance weights, and the multi-gray-scale image is expressed by illuminating desired subfields, the image display apparatus comprising:

a filter unit including a two-dimensional high pass filter, a two-dimensional low pass filter, a time response low pass filter, and an addition unit, wherein the input image signal is supplied to the two-dimensional high pass filter and the two-dimensional low pass filter, an output of the two-dimensional high pass filter is transmitted to the time response low pass filter, and the addition unit adds an output of the time response low pass filter to an output of the two-dimensional low pass filter;

a first selecting means for selecting a group of gray scale levels which cause the number of selectable gray scale levels to increase as a motion amount of the input image signal output from the filter unit decreases, among a plurality of gray scale levels, wherein the luminance weights are represented as W1, W2, ... and WN, each of the plurality of gray scale levels is expressed by an arbitrary combination of 0, W1, W2, ... and WN, and the motion amount is a change of the input image signal over time;

a second selecting means for selecting a gray scale level in accordance with a gray scale level of the input image signal, among the group of gray scale levels selected by the first selecting means; and a subfield illuminating means for illuminating subfields corresponding to the gray scale level selected by the second selecting means.

17. An image display apparatus which displays a multi-gray-scale image, where the multi-gray-scale image is displayed in a time unit called a TV field which is divided into N subfields which are respectively assigned luminance weights, and the multi-gray-scale image is expressed by illuminating desired subfields, the image display apparatus comprising:

a filter unit including a time response high pass filter, a time response low pass filter, a two-dimensional low pass filter, and an addition unit, wherein the time response high pass filter receives the input image signal and outputs only components of the input image signal that change radically over time, the two-dimensional low pass filter suppresses high-frequency components in spatial frequencies of the output components that change radically over time, and the addition unit adds an output of the time response low pass filter to an output of the two-dimensional low pass filter;

a first selecting means for selecting a group of gray scale levels which cause the number of selectable gray scale levels to increase as a motion amount of the input image signal output from the filter unit decreases, among a plurality of gray scale levels, wherein the luminance weights are represented as W1, W2, ... and WN, each of the plurality of gray scale levels is expressed by an arbitrary combination of 0, W1, W2, ... and WN, and the motion amount is a change of the input image signal over time;

a second selecting means for selecting a gray scale level in accordance with a gray scale level of the input image signal, among the group of gray scale levels selected by the first selecting means; and a subfield illuminating means for illuminating subfields corresponding to the gray scale level selected by the second selecting means.

18. An image display apparatus which displays a multi-gray-scale image, where the multi-gray-scale image is displayed in a time unit called a TV field which is divided into a plurality of subfields which are respectively assigned luminance weights, and the multi-gray-scale image is expressed by illuminating desired subfields, the image display apparatus comprising:

a converting means for converting an input image signal into subfield information for each pixel, the subfield information showing a state of each subfield, the state being either of ON and OFF which respectively correspond to illumination and non-illumination;

a display having a display screen which is composed of a plurality of pixels being illumination cells; and a display control means which controls illumination of the illumination cells by sequentially reading the subfield information in units of TV fields and by illuminating the illumination cells in accordance with the read subfield information, and prior to the illumination of the illumination cells, initializes the plurality of pixels and performs an addressing of pixels to be illuminated, wherein the display control means initializes the plurality of pixels before each subfield and performs the initialization (the number of subfields−1) times for each TV field, wherein the converting means stores information showing correspondence between each possible level of the input image signal and a piece of subfield information, wherein in the information stored in the converting means, input signal levels in a predetermined range correspond to pieces of subfield information which show illumination subfields extend either of forward and backward over time, and a total number of subfields in one TV field is N, and each TV field includes: a first subfield group being composed of successive M subfields to which one of same relatively large luminance weights and slightly and gradually changing relatively large luminance weights are assigned; and a second subfield group being composed of other (N-M) subfields, wherein each luminance weight assigned to each subfield in the first subfield group is equal to or less than a total luminance weight assigned to the second subfield group, and the display control means initializes the plurality of pixels before each subfield in the first subfield group and performs the initialization (M−1) times or less for each TV field.

19. An image display apparatus which displays a multi-gray-scale image, where the multi-gray-scale image is displayed in a time unit called a TV field which is divided into a plurality of subfields which are respectively assigned luminance weights, and the multi-gray-scale image is expressed by illuminating desired subfields, the image display apparatus comprising:

a filter unit including a two-dimensional high pass filter, a two-dimensional low pass filter, a time response low pass filter, and an addition unit, wherein the input image signal is supplied to the two-dimensional high pass filter and the two-dimensional low pass filter, an output of the two-dimensional high pass filter is transmitted to the time response low pass filter, and the addition unit adds an output of the time response low pass filter to an output of the two-dimensional low pass filter;

a converting means for converting the image signal output from the filter unit into subfield information for each pixel, the subfield information showing a state of each subfield, the state being either of ON and OFF which respectively correspond to illumination and non-illumination;

a display having a display screen which is composed of a plurality of pixels being illumination cells; and a display control means which controls illumination of the illumination cells by sequentially reading the subfield information in units of TV fields and by illuminating the illumination cells in accordance with the read subfield information, and prior to the illumination of the illumination cells, initializes the plurality of pixels and performs an addressing of pixels to be illuminated, wherein the display control means initializes the plurality of pixels before each subfield and performs the initialization (the number of subfields−1) times for each TV field, wherein the converting means stores information showing correspondence between each possible level of the input image signal and a piece of subfield information, wherein in the information stored in the converting means, input signal levels in a predetermined range correspond to pieces of subfield information which show illumination subfields extend either of forward and backward over time.

20. An image display apparatus which displays a multi-gray-scale image, where the multi-gray-scale image is displayed in a time unit called a TV field which is divided into a plurality of subfields which are respectively assigned luminance weights, and the multi-gray-scale image is expressed by illuminating desired subfields, the image display apparatus comprising:

a filter unit including a time response high pass filter, a time response low pass filter, a two-dimensional low pass filter, and an addition unit, wherein the time response high pass filter receives the input image signal and outputs only components of the input image signal that change radically over time, the two-dimensional low pass filter suppresses high-frequency components in spatial frequencies of the output components that change radically over time, and the addition unit adds an output of the time response low pass filter to an output of the two-dimensional low pass filter;

a converting means for converting the image signal output from the filter unit into subfield information for each pixel, the subfield information showing a state of each subfield, the state being either of ON and OFF which respectively correspond to illumination and non-illumination;

a display having a display screen which is composed of a plurality of pixels being illumination cells; and a display control means which controls illumination of the illumination cells by sequentially reading the subfield information in units of TV fields and by illuminating the illumination cells in accordance with the read subfield information, and prior to the illumination of the illumination cells, initializes the plurality of pixels and performs an addressing of pixels to be illuminated, wherein the display control means initializes the plurality of pixels before each subfield and performs the initialization (the number of subfields−1) times for each TV field, wherein the converting means stores information showing correspondence between each possible level of the input image signal and a piece of subfield information, wherein in the information stored in the converting means, input signal levels in a predetermined range correspond to pieces of subfield information which show illumination subfields extend either of forward and backward over time.

21. In an image display apparatus that receives an input image signal, the improvement comprising:

a filter unit including a two-dimensional high pass filter, a two-dimensional low pass filter, a time response low pass filter, and an addition unit, wherein the input image signal is supplied to the two-dimensional high pass filter and the two-dimensional low pass filter, an output of the two-dimensional high pass filter is transmitted to the time response low pass filter, and the addition unit adds an output of the time response low pass filter to an output of the two-dimensional low pass filter, and the result output from the filter unit is displayed on a display.

22. In an image display apparatus that receives an input image signal, the improvement comprising:

a filter unit including a time response high pass filter, a time response low pass filter, a two-dimensional low pass filter, and an addition unit, wherein the time response high pass filter receives the input image signal and outputs only components of the input image signal that change radically over time, the two-dimensional low pass filter suppresses high-frequency components in spatial frequencies of the output components that change radically over time, and the addition unit adds an output of the time response low pass filter to an output of the two-dimensional low pass filter, and the result output from the filter unit is displayed on a display.

* * * * *